US012604134B2

(12) United States Patent
Zhang et al.

(10) Patent No.: US 12,604,134 B2
(45) Date of Patent: Apr. 14, 2026

(54) DEVICE OF POLYMERIC BONE CONDUCTION SOUND TRANSMISSION COMPONENT, HEADSET AND HEADSET SYSTEM

(71) Applicant: Ningbo Sogen Electronics Technology Co., Ltd., Yuyao City (CN)

(72) Inventors: Hao Zhang, Yuyao City (CN); Ronghua Zhu, Yuyao City (CN); Wei Zhao, Yuyao City (CN); Shundong Pan, Yuyao City (CN); Yuqing Lei, Yuyao City (CN)

(73) Assignee: Ningbo Sogen Electronics Technology Co., Ltd., Yuyao City (CN)

( * ) Notice: Subject to any disclaimer, the term of this patent is extended or adjusted under 35 U.S.C. 154(b) by 183 days.

(21) Appl. No.: 18/430,331

(22) Filed: Feb. 1, 2024

(65) Prior Publication Data

US 2024/0284089 A1 Aug. 22, 2024

(30) Foreign Application Priority Data

| | | |
|---|---|---|
| Feb. 16, 2023 | (CN) | 202320290466.4 |
| Mar. 2, 2023 | (CN) | 202320438816.7 |
| Sep. 1, 2023 | (CN) | 202322375415.4 |
| Sep. 1, 2023 | (CN) | 202322378781.5 |
| Sep. 1, 2023 | (CN) | 202322386761.2 |
| Sep. 20, 2023 | (CN) | 202322576688.5 |
| Sep. 26, 2023 | (CN) | 202322631972.8 |

(51) Int. Cl.

| | |
|---|---|
| ***H04R 1/10*** | (2026.01) |
| ***F21V 33/00*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ....... *H04R 1/1075* (2013.01); *F21V 33/0056* (2013.01); *H04R 1/1008* (2013.01); *H04R 1/1041* (2013.01); *H04R 9/025* (2013.01); *H04R 9/045* (2013.01); *H04R 9/06* (2013.01); *H04R 2460/13* (2013.01)

(58) Field of Classification Search

CPC .. H04R 1/1075; H04R 1/1008; H04R 1/1041; H04R 9/025; H04R 9/045; H04R 9/06; H04R 2460/13; H04R 9/02; F21V 33/0056

See application file for complete search history.

(56) References Cited

U.S. PATENT DOCUMENTS

| | | | | |
|---|---|---|---|---|
| 11,050,870 | B2 * | 6/2021 | Kunimoto ................ | H04R 1/24 |
| 11,115,751 | B2 * | 9/2021 | Zheng .................. | H04R 1/2803 |
| 11,297,436 | B1 * | 4/2022 | Wen ....................... | H04R 9/025 |
| 11,388,506 | B2 * | 7/2022 | Wang ..................... | H04R 1/105 |
| 11,570,550 | B2 * | 1/2023 | Zheng .................. | H04R 25/606 |
| 12,101,593 | B2 * | 9/2024 | Wang ..................... | H04R 1/105 |
| 2009/0285417 | A1 * | 11/2009 | Shin ......................... | H04R 9/06 381/151 |

(Continued)

*Primary Examiner* — Oyesola C Ojo

(57) ABSTRACT

The present invention discloses a device of a polymeric bone conduction sound transmission component, a headset and a headset system, wherein a plurality of components of a sound generating unit are directly mounted on a housing; during operation of the device, only some of the components vibrate, and weight of the vibrating components is small, which can reduce the possibility of loose connection of the vibrating components.

17 Claims, 14 Drawing Sheets

(56) References Cited

U.S. PATENT DOCUMENTS

| | | | | |
|---|---|---|---|---|
| 2019/0069075 | A1* | 2/2019 | Geng | H04R 9/06 |
| 2020/0336824 | A1* | 10/2020 | Zheng | H04R 29/003 |
| 2021/0152909 | A1* | 5/2021 | Peng | H04R 9/025 |
| 2022/0159382 | A1* | 5/2022 | Zhu | H04R 9/043 |
| 2022/0303665 | A1* | 9/2022 | Zhang | H04R 1/1016 |
| 2022/0329926 | A1 | 10/2022 | Han et al. | |
| 2023/0370764 | A1 | 11/2023 | Wang et al. | |
| 2024/0022848 | A1 | 1/2024 | Lu | |
| 2024/0137693 | A1* | 4/2024 | Fu | H04R 5/027 |
| 2024/0155298 | A1* | 5/2024 | Wen | H04R 9/06 |

* cited by examiner

D

E

C

DEVICE OF POLYMERIC BONE CONDUCTION SOUND TRANSMISSION COMPONENT, HEADSET AND HEADSET SYSTEM

TECHNICAL FIELD

The present invention belongs to the field of earphones, and specifically relates to a device of a polymeric bone conduction sound transmission component, a headset and a headset system.

BACKGROUND

Bone conduction sound transmission is a sound transmission method that converts sound into mechanical vibration of different frequencies and transmits sound waves through human skull, spiral organ, auditory center, etc. It uses the skull as a sound transmission carrier, does not need to be worn in the ear, and has less damage to hearing. Therefore, it has a wide range of applications. For example, bone conduction sound transmission devices can be mounted on products such as earphones, hats and glasses to achieve the purpose of sound transmission through bone conduction.

A traditional bone conduction sound transmission device is mainly composed of an outer housing, an electronic assembly, an inner housing, a sound generating unit and other components, and the sound generating unit is composed of a coil, a magnetic circuit structure and other components. In production of a bone conduction product, a plurality of components of the sound generating unit are assembled in the inner housing, and then the inner housing is fixed in the outer housing by means of gluing, and the outer housing can be directly in contact with the human skull. During operation of the device, the sound generating unit generates vibration as a whole and transmits the vibration to the outer housing. Since the sound generating unit has a large weight as a whole, the gluing between the inner housing and the outer housing may loosen during long-term vibration, and even the whole sound generating unit may be detached, resulting in sound breakage, damage and other problems of the bone conduction product. Moreover, it is also quite cumbersome to mount the sound generating unit in the inner housing.

SUMMARY

In view of the deficiencies of the prior art, it is an object of the present invention to provide a device of a polymeric bone conduction sound transmission component, a headset and a headset system, wherein a plurality of components of a sound generating unit are directly mounted on a housing; during operation of the device, only some of the components vibrate, and weight of the vibrating components is small, which can reduce the possibility of loose connection of the vibrating components.

In order to achieve the above object, the present invention provides the following technical solutions: a device of a polymeric bone conduction sound transmission component, comprises: a housing and a sound generating unit, an accommodating cavity is formed in the housing, the sound generating unit comprises a coil and a magnetic circuit structure, the coil and the magnetic circuit structure are both arranged in the accommodating cavity, a mounting member is arranged in the accommodating cavity, and the sound generating unit is in a first state or a second state; in the first state, the magnetic circuit structure is mounted on an inner wall of the housing by the mounting member, and the coil is mounted on the inner wall of the housing; and in the second state, the coil is mounted on the inner wall of the housing by the mounting member, and the magnetic circuit structure is mounted on the inner wall of the housing.

By adopting the above-mentioned technical solutions, the coil and the magnetic circuit structure are directly mounted on an outer housing, so that there is no need to separately provide an outer housing outside the sound generating unit, which simplifies assembly of the device, can reduce the overall volume or thickness of the device, and improve the sound effect; and the sound generating unit can be in the first state or the second state, in the first state, when the device is in operation, only the magnetic circuit structure vibrates and transmits the vibration to the housing by the mounting member, and in the second state, when the device is in operation, only the coil vibrates and transmits the vibration to the housing by the mounting member. Regardless of whether the sound generating unit is in the first state or the second state, the vibrating component of the device has a lighter weight compared to the way in which the sound generating unit vibrates as a whole in the traditional structure, which can reduce the risk of loosening the connection with the housing when the vibrating component vibrates. In addition, in the present application, the vibration of the vibrating component is transmitted directly to the housing and then to the skull of the wearer by the mounting member, resulting in a more direct transmission process and less energy loss.

In addition, the present invention also discloses a headset, comprising the above-mentioned device of a polymeric bone conduction sound transmission component, a rear pillow and a light-emitting source, and a light outlet is provided on the housing; the rear pillow is connected with the housing, the rear pillow is provided with a light transmission portion corresponding to the housing, and the light transmission portion is arranged at the light outlet; and the light-emitting source is arranged in the housing, and in a light-emitting state, light is emitted from the light outlet to the light transmission portion to cause the light transmission portion to emit light.

A headset system, comprises the above-mentioned device of a polymeric bone conduction sound transmission component and a connecting line; the connecting line comprises a connecting main portion and a plurality of connectors; a plug-in protrusion is provided on the connecting main portion, one end of the plug-in protrusion is provided with a mounting surface, one end of the plug-in protrusion located on the mounting surface is convexly provided with a protective protrusion, and one end of the protective protrusion facing away from the mounting surface is provided with a magnetic attraction surface; each of the connectors is fitted to the connecting main portion, and at least one of the connectors and the other of the connectors are arranged circumferentially on an outer circumference of the protective protrusion, and each of the connectors is located on a side of the magnetic attraction surface facing the mounting surface; the housing is provided with a plug-in recess corresponding to the plug-in protrusion and a protective recess corresponding to the protective protrusion thereon; a mating member is provided in the plug-in recess corresponding to each of the connectors; a mating surface is provided on the protective recess corresponding to the magnetic attraction surface; and the plug-in protrusion is inserted into the plug-in recess in an aligned manner to align the protective protrusion and the protective recess and align each of the connectors and the corresponding mating member, the protective protrusion enters the protective recess so that the magnetic attraction surface magnetically fits the mating surface, and each of the connectors and the corresponding mating member are brought into contact to make the connecting line conductive.

Figure 1:
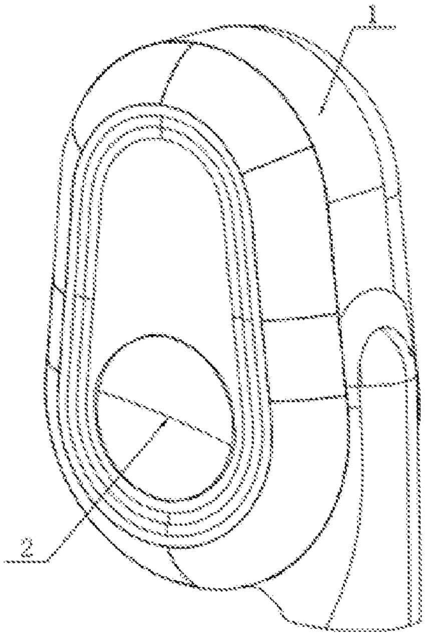
FIG. 1 is an assembly view of a portion of a manipulation button in Example 1.
Figure 2:
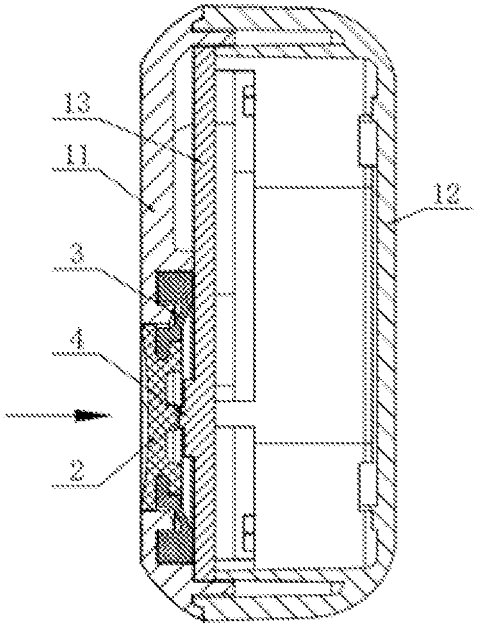
FIG. 2 is a sectional view of a portion of the manipulation button in Example 1.
Figure 3:
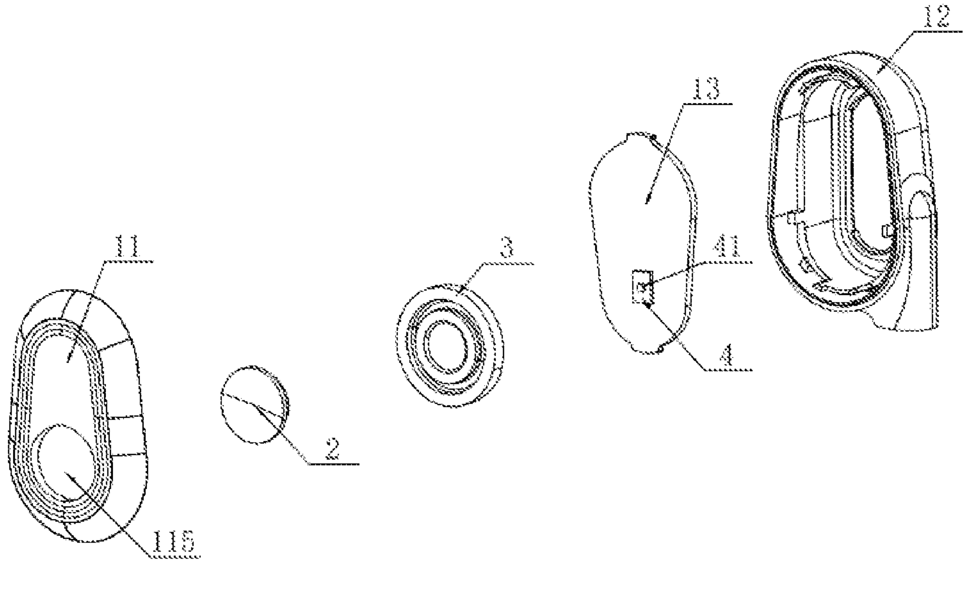
FIG. 3 is an exploded view of a portion of the manipulation button in Example 1.
Figure 4:
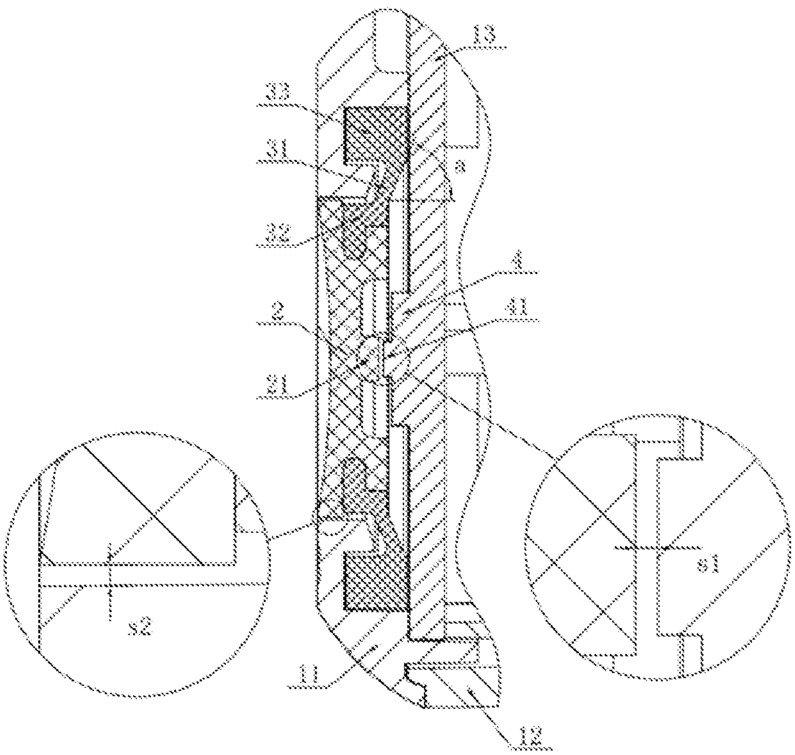
FIG. 4 is an enlarged view of a portion of FIG. 3.
Figure 5:
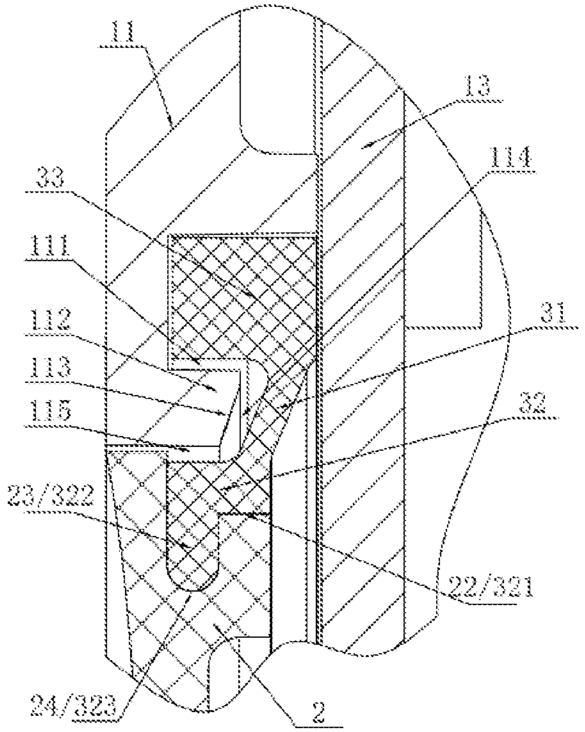
FIG. 5 is an enlarged view of a portion of FIG. 3.

Reference numerals: housing 1; first half housing 11; second half housing 12; first circuit board 13; snap-in recess 111; housing ring portion 112; inclined ring surface 113; separation gap 114; built-in cavity 115; manipulation button 2; action portion 21; second fitting surface 22; reinforcing recess 23; second mating cambered surface 24; elastic layer 3; deformation ring portion 31; inner connecting portion 32; outer connecting portion 33; first fitting surface 321; reinforcing protrusion 322; first mating cambered surface 323; electronic button 4; force-receiving portion 41; vibrating plate 5; fixing portion 6; first spatial domain 61; second spatial domain 62; inner domain 63; side edge 64; connecting portion 7; fixing segment 71; vibration segment 72; main connecting segment 73; third side surface 711; fourth side surface 712; first side surface 721; second side surface 722; first section 731; second section 732; linking segment 733; first extension segment 7311; first reverse arc segment 7312; second extension segment 7321; second reverse arc segment 7322; first segment body 741; second segment body 742; third segment body 743; fourth segment body 744; first reverse segment 745; second reverse segment 746; third reverse segment 747; vibration portion 8; connecting position 81; vibrating plate main portion 82; vibrating plate side portion 83; first connecting position 91; second connecting position 92; first outer housing 101; second outer housing 102; accommodating cavity 103; mounting region 104; sound generating unit 20; coil 201; positioning groove 2011; magnetic circuit structure 202; base steel 2021; magnet 2022; magnet pressing disc 2023; positioning convex edge 30; mounting member 40; fixing plate 401; positioning groove 40231; mounting step 50; limiting groove 501; gasket 60; positioning post 601; light outlet 1-1; second mounting jack 1-2; sound generating portion 1-3; ear hanger 1-4; body portion 1-5; main housing 1-51; second circuit board 1-52; side cover 1-53; mounting cavity 1-511; rear pillow 2-0; light transmission portion 2-1; linking portion 2-2; first mounting jack 2-21; light-emitting source 3-0; connecting main portion 1.0; plug-in protrusion 1.1; mounting surface 1.11; mounting hole 1.12; mounting opening 1.13; straight-line portion 1.14; circular arc portion 1.15; protective protrusion 2.0; magnetic attraction surface 2.1; integral face 2.2; arc transition surface 2.3; connector 3.0; contact end portion 3.1; first functional member 3.2; second functional member 3.3; base 3.4; pin body 3.5; return spring 3.6; reset member 4.0; first magnetic attraction member 5.0; plug-in recess 6.1; protective recess 6.2; mating surface 6.21; mating member 7.0; and second magnetic attraction member 8.0.

DESCRIPTION OF THE EMBODIMENTS

Example 1

Figure 6:
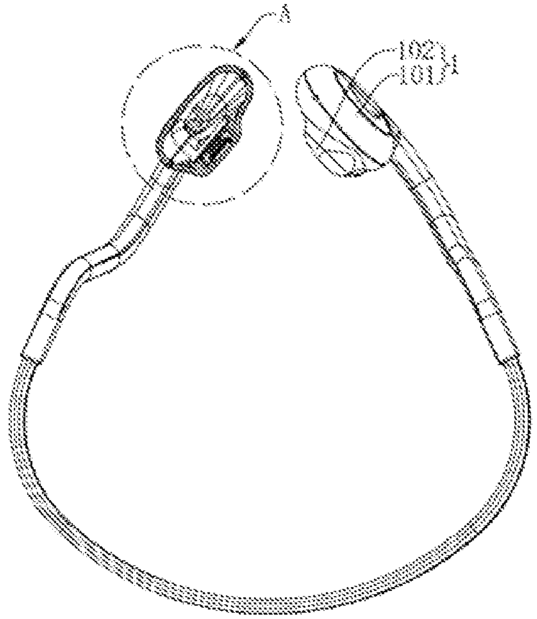
FIG. 6 is a schematic structural view of a portion of a sound generating unit in Example 1 (the sound generating unit is in a first state)
Figure 7:
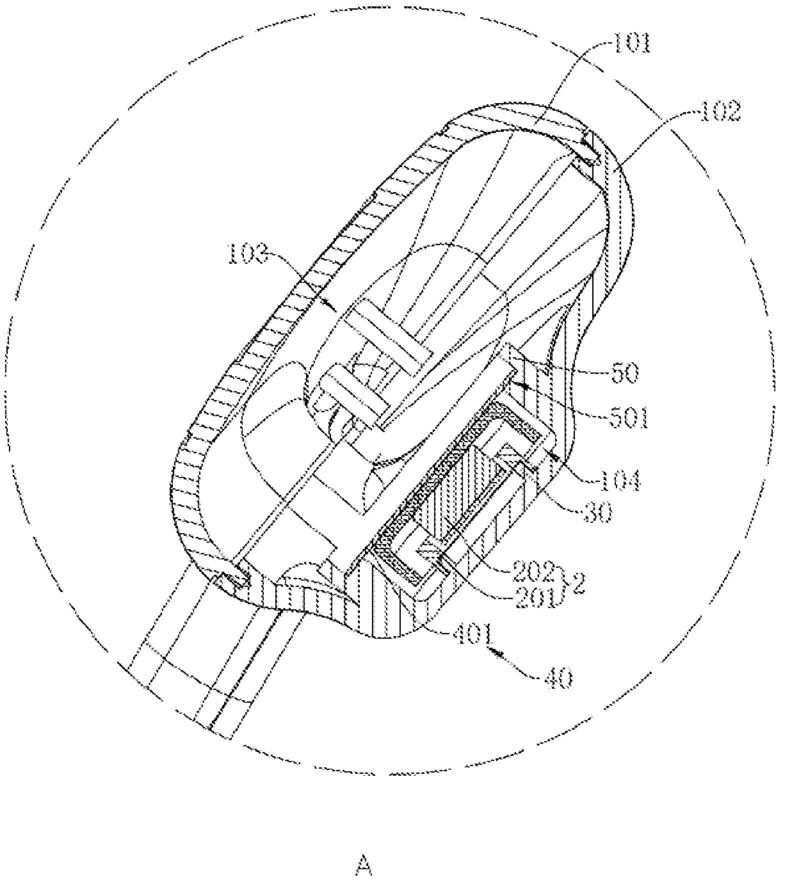
FIG. 7 is an enlarged schematic view of A in FIG. 6.

With reference to FIGS. 6 and 7, the present invention discloses a device of a polymeric bone conduction sound transmission component which comprises a sound generating portion. The sound generating portion comprises a housing 1 and a sound generating unit 20, an accommodating cavity 103 is formed in the housing 1, and a plurality of components of the sound generating unit 20 are directly mounted in the accommodating cavity 103 without the need for separately wrapping around and providing an inner housing outside the sound generating unit 20, resulting in simpler assembly steps. Furthermore, during the operation of the sound generating unit 20, only some of the components vibrate, and weight of the vibrating components is small, which can reduce the risk of loose connection between the sound generating unit 20 and the housing 1 during operation.

The sound generating unit 20 comprises a coil 201 and a magnetic circuit structure 202, a mounting member 40 is provided in the housing 1, and the sound generating unit 20 can be in a first state or a second state depending on how the coil 201 and the magnetic circuit structure 202 are mounted in a mounting region 104.

In the first state of the sound generating unit 20, the magnetic circuit structure 202 is fixedly mounted in the housing 1 by the mounting member 40, and the coil 201 is fixed on an inner wall of the housing 1; in the first state, an audio electric signal is applied to the coil 201, the coil 201 remains fixed with respect to the housing 1, and the magnetic circuit structure 202 interacts with the coil 201 to cause the magnetic circuit structure 202 to generate vibrations and transmit the vibrations to the housing 1 by the mounting member 40 and then to the skull of a wearer to realize sound transmission.

In the second state of the sound generating unit 20, the coil 201 is fixedly mounted on the housing 1 by the mounting member 40, and the magnetic circuit structure 202 is fixed on the inner wall of the housing 1; in the second state, an audio electric signal is applied to the coil 201, the magnetic circuit structure 202 remains fixed with respect to the housing 1, and the coil 201 interacts with the magnetic circuit structure 202 to cause the coil 201 to generate vibrations and transmit the vibrations to the housing 1 by the mounting member 40 to realize sound transmission.

A relative position of the coil 201 and the magnetic circuit structure 202 remains unchanged regardless of whether the sound generating unit 20 is in the first state or in the second state, which is described in detail below taking the first state of the sound generating unit 20 as an example.

The housing 1 comprises a first outer housing 101 and a second outer housing 102, the first outer housing 101 and the second outer housing 102 are snap-fitted to each other and fixed by gluing, and a side surface of the second outer housing 102 away from the first outer housing 101 is directly fitted to the skull of the wearer. The first outer housing 101 and the second outer housing 102 form the accommodating cavity 103 therebetween, and the accommodating cavity 103 may be configured to accommodate the sound generating unit 20 and an electronic assembly. A side wall of the second outer housing 102 away from the first outer housing 101 is outwardly convex in a waist shape (the waist shape in this example refers to a pattern with semicircular arcs at both ends and parallel lines in the middle) to form the mounting region 104, the mounting region 104 is in the shape of a waist-shaped groove, and the coil 201 and the magnetic circuit structure 202 are both arranged in the mounting region 104.

In other application scenarios, the magnetic circuit structure 202 and the coil 201 may also be fixedly mounted on the first outer housing 101 and the second outer housing 102 respectively.

The sound generating unit 20 is contoured to match the shape of the mounting region 104. A side surface of the mounting region 104 away from the first outer housing 101 is a bottom wall of the mounting region 104, and a side surface perpendicular to the bottom wall thereof is a side wall of the mounting region 104. The side wall of the mounting region 104 is annular. The coil 201 is arranged close to the bottom wall of the mounting region 104, and the magnetic circuit structure 202 is mounted on a side of the coil 201 away from the bottom wall of the mounting region 104. The coil 201 is formed by winding a copper wire, and matches the shape of the mounting region 104. The magnetic circuit structure 202 comprises a base steel 2021, a magnet 2022 and a magnet pressing disc 2023, and the base steel 2021, the magnet 2022 and the magnet pressing disc 2023 are successively arranged along a direction close to the coil 201, and are glued and fixed to each other. The magnet 2022 extends into the coil 201 to apply an audio electrical signal to the coil 201, and the magnetic circuit structure 202 works with the coil 201 to cause the magnetic circuit structure 202 to vibrate.

In order to facilitate mounting of the coil 201, a first positioning structure is provided on the bottom wall of the mounting region 104, and a second positioning structure is provided on the coil 201. The first positioning structure and the second positioning structure are intermeshed with each other to realize positioning of the coil 201 to position and mount the coil 201 while limiting the coil during use to reduce the possibility of displacement of the coil 201.

The first positioning structure may be arranged in a concave, convex or combined concave-convex shape, and the second positioning structure matches the first positioning structure. The shapes of the first positioning structure and the second positioning structure are not limited thereto, and the first positioning structure and the second positioning structure may be arranged as any structure as long as the positioning of the coil 201 can be achieved.

In this example, the first positioning structure is arranged as a positioning raised edge 30, and the positioning raised edge 30 is in a waist-shaped annular shape and is integrally formed with the second outer housing 102; the second positioning structure is arranged as a positioning groove 2011, the positioning groove 2011 is arranged on an inner side of a side of the coil 201 close to the bottom wall of the mounting region 104, the coil 201 is sheathed and positioned on the positioning raised edge 30 by the positioning groove 2011, two mutually perpendicular side walls of the positioning groove 2011 are respectively fitted to two mutually perpendicular side walls of the positioning raised edge 30, and positions where the positioning groove 2011 are fitted to the positioning raised edge 30 are glued for fixing to realize fixed mounting of the coil 201.

The magnetic circuit structure 202 is mounted on the second outer housing 102 by the mounting member 40, and the mounting member 40 is glued and fixed to the base steel 2021 of the magnetic circuit structure 202, and the magnetic circuit structure 202 is connected with the second outer housing 102 by the mounting member 40. In this example, the mounting member 40 is arranged as a fixing plate 401, the fixing plate 401 is in the shape of a waist-shaped plate, an annular edge of the fixing plate 401 is fixed on the second outer housing 102, and a middle portion of the fixing plate 401 is fixedly connected with the magnetic circuit structure 202, so that the mounting of the magnetic circuit structure 202 can be realized.

In order to facilitate positioning and mounting of the fixing plate 401, a third positioning structure is provided on the side wall of the mounting region 104 away from the bottom wall of the mounting region 104, the third positioning structure can be arranged in a concave, convex or combined concave-convex shape, and the fixing plate 401 is matches the third positioning structure to realize the positioning of the fixing plate 401. After the fixing plate 401 is positioned, the magnet 2022 of the magnetic circuit structure 202 is partially located in the coil 201, and the third positioning structure can limit displacement of the fixing plate 401 in a direction in which a plate surface thereof extends, thus reducing the probability of collision and interference between the magnetic circuit structure 202 and the coil 201. Of course, the shape of the third positioning structure is not limited thereto, and the third positioning structure may be arranged in any structure as long as the positioning of the fixing plate 401 and thus the magnetic circuit structure 202 can be achieved.

In this example, the third positioning structure is arranged as a limiting groove 501; firstly, a mounting step 50 is integrally provided on an inner wall of the second outer housing 102, and the limiting groove 501 is arranged on the mounting step 50; and the edge of the fixing plate 401 is embedded in the limiting groove 501, and the limiting groove 501 can limit the displacement of the fixing plate 401 in the direction in which the plate surface thereof extends, so that the magnetic circuit structure 202 can be positioned.

A position where the fixing plate 401 is fitted to the side wall of the limiting groove 501 can be fixed by gluing; the plate surface of the fixing plate 401 is arranged as a complete and continuous plane; therefore, a gluing region between the fixing plate 401 and the housing 1 is provided continuously along the edge of the fixing plate 401; a gluing region between the fixing plate 401 and the side wall of the limiting groove 501 is larger; and the fixing plate 401 is more stably mounted on the housing 1.

In other application scenarios, the gluing region between the fixing plate 401 and the side wall of the limiting groove 501 can be reduced. For example, serrations and notches can be provided along the annular edge of the fixing plate 401, or a plurality of through holes can be provided along the position where the fixing plate 401 is fitted to the side wall of the limiting groove 501, or other structures can be used to reduce contact and gluing area between the edge of the fixing plate 401 and the second outer housing 102, thereby achieving the effects of improving sensitivity of the sound generating unit 20 and reducing power consumption.

In this example, a waist-shaped protrusion is provided on the second outer housing 102 to form the waist-shaped mounting region 104, and the shapes of such components as the coil 201 and the magnetic circuit structure 202 match the shape of the mounting region 104. In other application scenarios, the waist-shaped protrusion on the second outer housing 102 may also be arranged in a circular, elliptical, polygonal or irregular shape, and may form mounting regions 104 with different contour shapes, and the shapes of such components as the coil 201 and the magnetic circuit structure 202 may be adjusted accordingly. Of course, the protrusion may not be arranged on the second outer housing 102.

In this example, the mounting member 40 is arranged as the fixing plate 401, and an amplitude of the fixing plate 401 is limited when the magnetic circuit structure 202 vibrates, which results in better transmission of medium- and high-frequency sound.

The implementation principle is as follows: at the time of assembly, an opening of the second outer housing 102 is first placed upward, the coil 201 component is placed inside the second outer housing 102, and the coil 201 is mounted by means of the positioning convex edge 30; and then, the fixing plate 401 having the magnetic circuit structure 202 is mounted in the limiting groove 501 (the fixing plate 401 and the magnetic circuit structure 202 can be fixed when the magnetic circuit structure 202 is assembled), thus realizing mounting of the sound generating unit 20 through simple operation.

It should be noted that the above-mentioned sound generating portion may be applied to a headset of this example, and may also be applied alone or in other headset products.

In addition, as shown in FIGS. 1-5, the device further comprises a button portion, and in addition to the housing 1, the button portion further comprises a manipulation button 2 and an elastic layer 3 (annular); the manipulation button 2 is made of a hard material (e.g., a plastic button, a metal button, etc.), the elastic layer 3 is made of an elastic material (e.g., a rubber material, etc.), the manipulation button 2 is located on an inner circumference of the elastic layer 3 and the both are in embedded connection with each other; and the housing 1 is located on an outer circumference of the elastic layer 3 and the both are in embedded connection with each other. In addition, a right end of the manipulation button 2 is integrally formed and convexly provided with a cylindrical action portion 21. The device further comprises an electronic button 4; the electronic button 4 is fixedly arranged on the housing 1, the electronic button 4 is located on a right side of the manipulation button 2, a force-receiving portion 41 is arranged on a left side of the electronic button 4, and the force-receiving portion 41 is directly opposite to the action portion 21; and there is a spacing between the action portion 21 and the force-receiving portion 41, and the spacing is s1.

When the manipulation button 2 is pressed rightward, the action portion 21 moves towards the force-receiving portion 41 and presses the force-receiving portion 41, thus performing manipulation of the electronic button 4, while the elastic layer 3 is deformed to store elastic potential energy; and when the manipulation button 2 is released, that is, when the manipulation button 2 is not pressed, the elastic layer 3 elastically resets so that the action portion 21 moves away from the force-receiving portion 41 toward the left to release the action portion from the force-receiving portion.

Therefore, 1. the manipulation button 2 is pressed to move the action portion 21 to the force-receiving portion 41 by a stroke of s1, and then directly acts on the force-receiving portion 41 to move the force-receiving portion 41 by a certain stroke to realize manipulation of the electronic button 4; since the action portion 21 and the force-receiving portion 41 are both made of hard materials, the manipulation stroke is constant, and a change in the manipulation stroke due to the material of the elastic layer 3 does not occur, so that the user has a better manipulation feeling; 2. the manipulation button 2 is connected with the housing 1 by the elastic layer 3, and the manipulation button 2 is less affected when the housing 1 vibrates, thus resulting in a smaller amplitude, better stabilization and less likelihood to come into contact with the electronic button 4 which may cause inadvertent activation of the electronic button 4, and the spacing s1 between the action portion 21 and the force-receiving portion 41 can ensure that the action portion 21 does not come into contact with the force-receiving portion 41 to prevent inadvertent activation when the electronic button 4 vibrates; and 3. the action portion 21 and the force-receiving portion 41 facing each other make the transmission of force more direct, and the manipulation button 2 is less likely to be skewed, which further optimizes the manipulation feeling.

Specifically, in this example, the elastic layer 3 comprises a deformation ring portion 31 surrounding an outer circumference of the manipulation button 2, the deformation ring portion 31 is arranged to extend radially inward along a direction of the force-receiving portion 41 towards the action portion 21, and an included angle between the deformation ring portion 31 and an axial direction thereof is a, with 1°≤a≤89°, so that the inclined deformation ring portion 31 stores the elastic potential energy for resetting to the left when the manipulation button 2 is pressed rightward, resulting in smoother resetting.

In addition, in this example, an inner circumference of the deformation ring portion 31 is provided with an inner connecting portion 32 surrounding and covering the manipulation button 2, an inner circumference of the inner connecting portion 32 is provided with a first fitting surface 321 in a cylindrical shape, and the manipulation button 2 is provided with a second fitting surface 22 that matches the first fitting surface 321; and the first fitting surface 321 is inwards convexly provided with a reinforcing protrusion 322, and the second fitting surface 22 is concavely provided with a reinforcing recess 23 for inserting the reinforcing protrusion 322. Therefore, 1. the inner connecting portion 32 surrounds and covers the manipulation button 2 to serve as a first connection, and fit between the reinforcing protrusion 322 and the reinforcing recess 23 serves as a second connection, which result in better connection strength; and 2. the fit between the first fitting surface 321 and the second fitting surface 22 allow plane-plane fit, which results in better sealing effect.

The first fitting surface 321 and the second fitting surface 22 may also be truncated cone-shaped or cone-shaped.

Preferably, in this example, the reinforcing protrusion 322 is arranged in an annular shape, an inner circumference of the reinforcing protrusion 322 is provided with a first mating cambered surface 323, a shape and size of the reinforcing recess 23 are adapted to a shape and size of the reinforcing protrusion 322, and a second mating cambered surface 24 is provided in the reinforcing recess 23 corresponding to the first mating cambered surface 323. Therefore, 1. the annular reinforcing protrusion 322 and the annular reinforcing recess 23 achieve more convenient mutual fit, and a circumferential fit can further improve the sealing effect of the manipulation button 2 and the inner connecting portion 32; and 2. the fit between the first mating cambered surface 323 and the second mating cambered surface 24 is made tighter through arc-shaped mating, preventing right angle bending which results in incomplete filling.

Specifically, in this example, the housing 1 comprises a first half housing 11 (left side), a second half housing 12 (right side) and a first circuit board 13, the electronic button 4 is arranged on the first circuit board 13 and fixed by pin welding, the first circuit board 13 is clamped between the first half housing 11 and the second half housing 12, and the first half housing 11 and the second half housing 12 are fixed by bolting, snap-in or bonding, so that the three are fixedly connected.

In addition, in this example, an outer circumference of the deformation ring portion 31 is provided with an annular outer connecting portion 33, an axial end of the outer connecting portion 33 abuts against the first circuit board 13, and the other end abuts against the first half housing 11, so that the deformation ring portion 31 is mounted with the outer connecting portion 33 clamped and limited by the first half housing 11 and the first circuit board 13, and is sealed by pressing.

Specifically, in this example, a right side of the first half housing 11 is provided with an annular snap-in recess 111, and the outer connecting portion 33 partially extends into the snap-in recess 111; and in addition, a side of the deformation ring portion 31 facing the outer connecting portion 33 is arranged at one end of an inner circumference of the outer connecting portion 33 facing the first circuit board 13. Therefore, 1. the snap-in recess 111 is arranged so that the outer connecting portion 33 is partially confined in the snap-in recess 111 and is radially limited by the snap-in recess 111, thereby improving mounting stability; and 2. the deformation ring portion 31 is arranged at one end of the inner circumference of the outer connecting portion 33 facing the first circuit board 13, which maximizes a volume of the outer connecting portion 33 entering the snap-in recess 111, maximizes connection stability, and allows the deformation ring portion 31 to be further away from the first half housing 11 to prevent the deformation ring portion 31 from coming into contact with the first half housing 11 for a long time in a non-pressed state resulting in bonding.

The first half housing 11 is provided with a housing ring portion 112 on a radial inner side located in the snap-in recess 111, an end of the housing ring portion 112 facing the deformation ring portion 31 is provided with an inclined ring surface 113, the inclined ring surface 113 is arranged inclined radially inward along the direction of the force-receiving portion 41 facing the action portion 21, and a separation gap 114 is provided between the inclined ring surface 113 and the deformation ring portion 31, so that the inclined ring surface 113 is adapted to an inclination direction of the deformation ring portion 31, so that a spacing therebetween is more constant and difficult to contact to prevent the deformation ring portion 31 from coming into contact with the first half housing 11 for a long time in the non-pressed state resulting in bonding.

Preferably, in this example, a surface of the housing 1 (the first half housing 11) is provided with a built-in cavity 115, the manipulation button 2 is arranged in the built-in cavity 115, and there is a spacing between an outer circumferential wall of the manipulation button 2 and an inner circumferential wall of the built-in cavity 115, and the spacing is s2, with s2≤2 mm.

Therefore, the built-in cavity 115 is arranged to allow the manipulation button 2 to be built in and not easily actuated inadvertently, while the spacing s2 ensures that the manipulation button 2 does not come into contact with the housing 1 when the housing 1 vibrates, so that the manipulation button 2 is less affected, thus resulting in a smaller amplitude, better stabilization and less likelihood to come into contact with the electronic button 4 which may cause inadvertent activation of the electronic button 4.

Preferably, in this example, s1 is ≤1.5 mm.

It should be noted that the above-mentioned button portion may be applied to the headset of this example, and may also be applied alone or in other headset products.

Example 2

Figure 8:
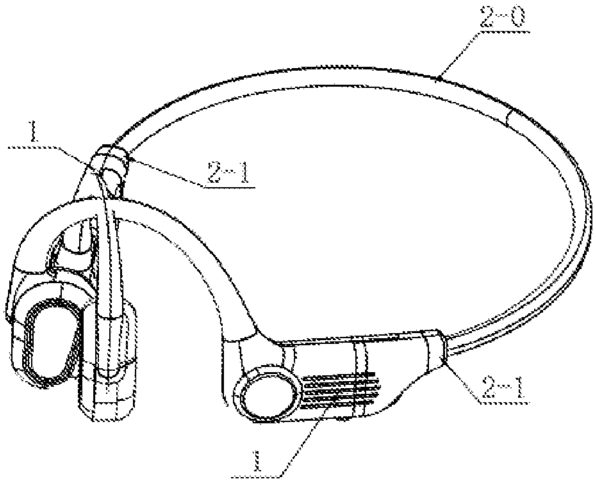
FIG. 8 is an assembly view of Example 2.
Figure 9:
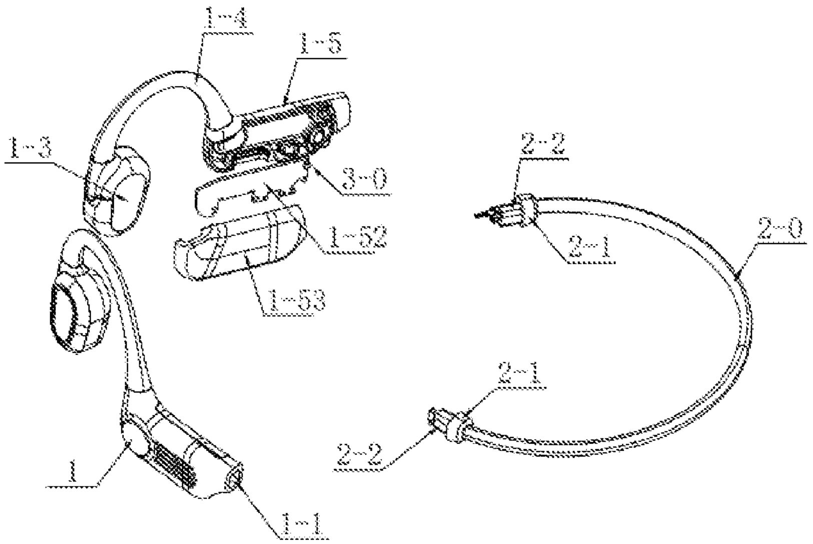
FIG. 9 is an exploded view of Example 2.
Figure 10:
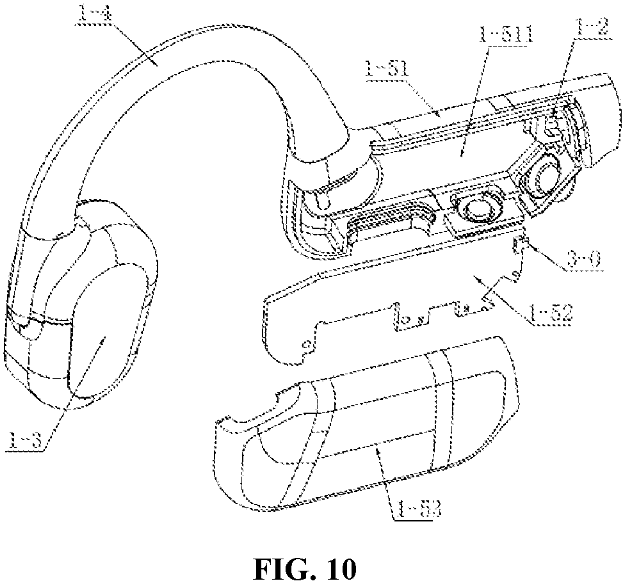
FIG. 10 is an exploded view of a housing in Example 2.
Figure 11:
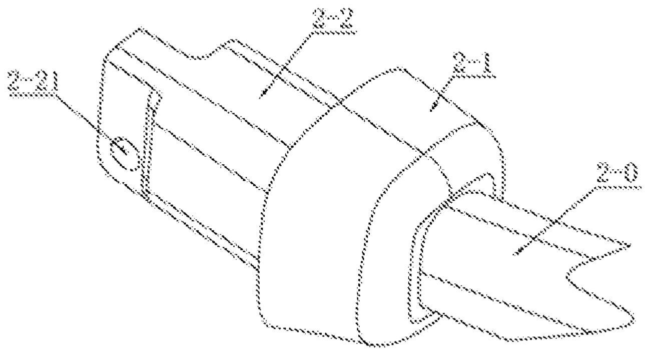
FIG. 11 is an enlarged view of a portion of FIG. 9.
Figure 12:
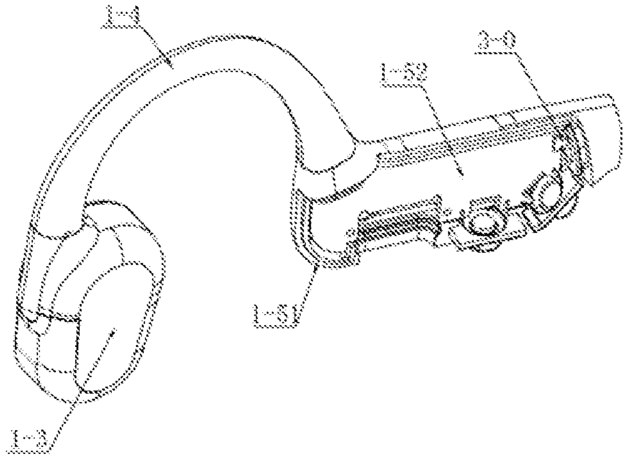
FIG. 12 is an assembly view of the housing in Example 2 with a side cover removed.

With reference to FIGS. 8 and 12, the present invention also discloses a headset which comprise the device of a polymeric bone conduction sound transmission component according to Example 1, a rear pillow 2-0 and a light-emitting source 3-0, wherein the number of housings 1 is 2 and they are configured to be worn on left and right ears, and a light outlet 1-1 is provided on a rear side of the housing 1; the rear pillow 2-0 is connected with the two housings 1, in addition, the rear pillow 2-0 is provided with a light transmission portion 2-1 corresponding to the housing 1, and the light transmission portion 2-1 is arranged at the light outlet 1-1; and the light-emitting source 3-0 is arranged in the housing 1, and in a light-emitting state, light is emitted from the light outlet 1-1 to the light transmission portion 2-1 to cause the light transmission portion 2-1 to emit light.

Therefore, 1. during outdoor use at night, the light-emitting source 3-0 can be controlled to emit light so that the light acts on the light transmission portion 2-1 to realize shininess of the light transmission portion 2-1, thereby prompting surrounding people; and 2. the light-emitting source 3-0 is directly arranged in the housing 1, so that there is no need to arrange a space in the rear pillow 2-0 for mounting the light-emitting source 3-0, resulting a simple structure of the rear pillow 2-0, and furthermore, components such as a second circuit board 1-52 and a conducting line need to be mounted in the housing 1, so that the light-emitting source 3-0 can be mounted when the above-mentioned structure is mounted, that is, the process of mounting the light-emitting source 3-0 along with the housings 1 does not complicate the mounting process of the overall structure, so as to prevent an excessively complicated mounting process from increasing manufacturing cost of the headset.

Specifically, the light-emitting source 3-0 uses led beads.

Preferably, in this example, the light transmission portion 2-1 is provided with a linking portion 2-2, and the linking portion 2-2 is inserted into the housing 1 from the light outlet 1-1 to connect the rear pillow 2-0 with the housing 1, so that a space in the light outlet is effectively utilized for direct insertion into the light outlet 1-1 for insertion, thereby simplifying the structure of the housing 1.

Preferably, the linking portion 2-2 is arranged at an end of the light transmission portion 2-1 facing away from the rear pillow 2-0.

Preferably, in this example, the linking portion 2-2 is made of the same material as the light transmission portion 2-1 and is integrally formed, which simplifies the structure of a combination of the light transmission portion 2-1 and the linking portion 2-2 to the greatest extent, and reduces manufacturing cost of the portion, thus reducing the manufacturing cost of the headset.

Preferably, in this example, the rear pillow 2-0 has the same material as the light transmission portion 2-1, and the rear pillow 2-0 is U-shaped (better to be worn on the neck) and is integrally formed with the light transmission portion 2-1, which simplifies the structure of a combination of the light transmission portion 2-1 and the rear pillow 2-0 to the greatest extent, and reduces manufacturing cost of the portion, thus reducing the manufacturing cost of the headset.

Preferably, in this example, the rear pillow 2-0 is provided with a memory metal wire by means of opening and threading; and an outer circumference of the rear pillow 2-0 is provided with an outer coating by means of sheathing.

Therefore, the memory metal wire can ensure corresponding deformation is recovered after deformation of the rear pillow 2-0, and prevent wearing comfort being affected due to repeated wearing and excessive deformation of the headset, and the outer coating is arranged so that a more comfortable material is used as the outer coating to improve the wearing comfort.

In other examples, no memory metal wire or coating is arranged in the rear pillow 2-0.

In addition, in the rear pillow 2-0, electric wires are also threaded by opening or the like to realize wire connection of circuit portions of the housings 1 on both sides.

In other examples, wireless connection may be used directly without provision of any electric wire.

In addition, in this example, the headset further comprises a plug connector (not shown), a first mounting jack 2-21 is provided on the linking portion 2-2, a second mounting jack 1-2 is provided on the housing 1, and the plug connector is respectively inserted into the first mounting jack 2-21 and the second mounting jack 1-2 to limit the linking portion 2-2 from moving away from the light outlet 1-1, so that the rear pillow 2-0 is more stably connected with the housing 1.

Preferably, the first mounting jack 2-21 and the second mounting jack 1-2 each extend in a direction perpendicular to a direction in which the linking portion 2-2 is inserted into the light outlet 1-1.

Here, the plug connector may be a bolt or a rod.

Specifically, in this example, the housing 1 comprises a sound generating portion 1-3, an ear hanger 1-4 and a body portion 1-5, the sound generating portion 1-3 (front side) and the body portion 1-5 (rear side) are respectively arranged on both sides of the ear hanger 1-4, and the light outlet 1-1 is arranged on the body portion 1-5, so that the headset is hung and worn by using the ear hangers 1-4, thereby realizing more stable wearing in outdoor use.

Specifically, in this example, one of the body portions 1-5 comprises a main housing 1-51, the second circuit board 1-52 and a side cover 1-53; a mounting cavity 1-511 having an opening is provided in the main housing 1-51, and the opening of the mounting cavity 1-511 faces the other housing 1; the second circuit board 1-52 is loaded into the mounting cavity 1-511 through the opening of the mounting cavity 1-511, the side cover 1-53 is arranged in the main housing 1-51 by means of snap-in, bonding, etc. and closes the opening of the mounting cavity 1-511; and in addition, the plug connector is also located in the mounting cavity 1-511, and the second circuit board 1-52 is arranged on a side of the plug connector facing the opening of the mounting cavity 1-511, and is configured to limit the plug connector from exiting the first mounting jack 2-21 and the second mounting jack 1-2, thus ensuring the mounting stability.

Preferably, the second circuit board 1-52 in the other body portion 1-5 is replaced with a battery, so that the second circuit board 1-52 is arranged on one side and the battery is arranged on one side to balance weight of the housings 1 on the left and right sides for more comfortable wearing.

Specifically, the second mounting jack 1-2 is arranged on a side of the mounting cavity 1-511 facing away from the other housing 1, and a side of the second mounting jack 1-2 facing the other housing 1 is provided with an opening, the first mounting jacks 2-21 are provided with an opening along two opposite ends of the two housings 1, and the first mounting jack 2-21 is located on the side of the second mounting jack 1-2 facing the other housing 1, so that the plug connector is firstly inserted into the first mounting jack 2-21, and then inserted into the second mounting jack 1-2 to complete the mounting.

The led beads are arranged on the second circuit board 1-52, and emit light after the second circuit board 1-52 is mounted at a corresponding position, which further facilitates the mounting.

Example 3

A device of a polymeric bone conduction sound transmission component, has a main structure the same as that of Example 1, and differences lie in that the number of reinforcing protrusions 322 and reinforcing recesses 23 is several, and they are arranged at equal intervals along a circumferential direction of the inner connecting portion 32, so that the fit between the reinforcing protrusions 322 and the reinforcing recesses 23 also has the function of circumferential limiting.

A headset, has a main structure the same as that of Example 2, and has the same differences from Example 1 as described previously in this example.

Example 4

Figure 13:
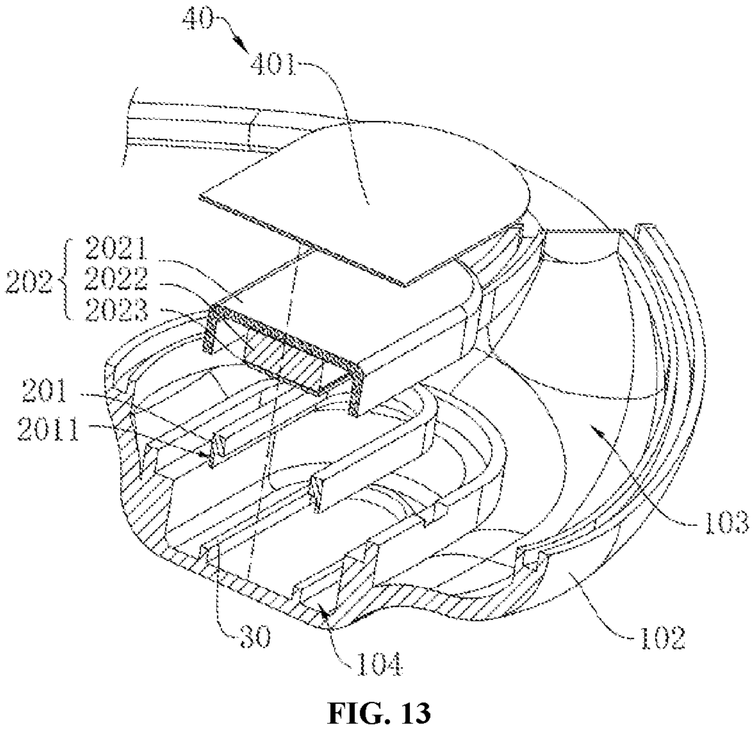
FIG. 13 is a schematic structural view of an exploded structure of a mounting member, a sound-emitting unit and a second outer housing in Example 4.
Figure 14:
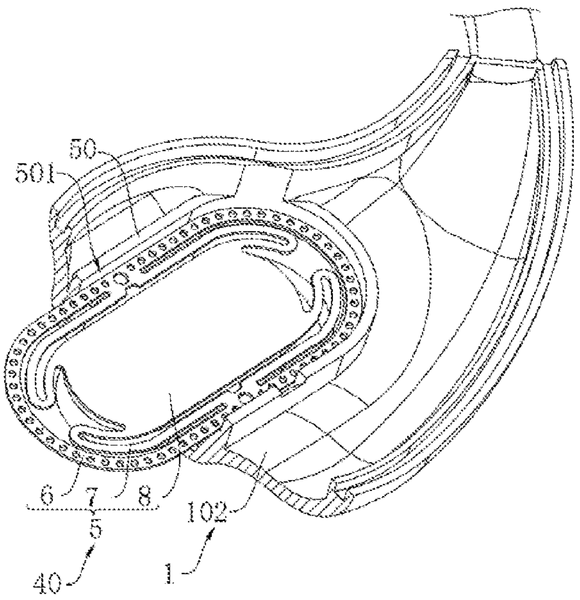
FIG. 14 is a schematic view of a mounting structure of the sound generating unit in the second outer housing in Example 4 (the sound generating unit is in the first state)

As shown in FIGS. 13-14, a device of a polymeric bone conduction sound transmission component, has a main structure the same as that of Example 1, and differences lie in that the mounting member 40 is arranged as a vibrating plate 5, the base steel 2021 of the magnetic circuit structure 202 is fitted and glued to the vibrating plate 5 for fixation, and the magnetic circuit structure 202 is mounted in the housing 1 by the vibrating plate 5.

The vibrating plate 5 is in the shape of a waist plate, and the vibrating plate 5 is composed of a fixing portion 6, connecting portions 7 and a vibration portion 8; the fixing portion 6 is in a waist-shaped annular shape, the vibration portion 8 is in the waist-shaped plate shape, and the vibration portion 8 is arranged in an annular structure of the fixing portion 6 and matches the shape of the fixing portion 6; the connecting portions 7 are arranged between the fixing portion 6 and the vibration portion 8, four connecting portions 7 are provided in total, and the four connecting portions 7 are symmetrically arranged along a width direction and a length direction of the vibrating plate 5; the connecting portion 7 extends outward from a short edge of an edge of the vibration portion 8 in a length direction of the vibration portion 8, then wraps around to a middle position of a long edge of the vibration portion 8 and extends outward to the fixing portion 6; and an outer ring edge of the fixing portion 6 is fixed on the side wall of the limiting groove 501 by gluing, an audio electric signal is applied to the coil 201, and the magnetic circuit structure 202 works with the coil 201 to cause the magnetic circuit structure 202 to vibrate, thereby driving the vibration portion 8 of the vibrating plate 5 to vibrate in a thickness direction thereof.

The fixing portion 6 has a same structure as that of the edge of the fixing plate 401, that is, through holes, notches, serrations or other structures may be provided on the fixing portion 6 to reduce a connection area of the fixing portion 6 and the housing 1. In this example, the fixing portion 6 is provided with a ring of through-holes thereon, and vibration generated by the magnetic circuit structure 202 is transmitted to the housing 1 by the vibrating plate 5 and is more concentrated, so that sensitivity of the sound generating unit 20 can be improved.

Since an edge of the vibrating plate 5 is fixed, when vibration amplitude of the magnetic circuit structure 202 and the vibration portion 8 is large, deformation of the vibrating plate 5 is large, and the magnetic circuit structure 202 and the connecting portion 7 may collide. In order to reduce the possibility that the magnetic circuit structure 202 collides with the connecting portion 7, the area of a plate surface of the vibration portion 8 may be enlarged so that the vibration portion 8 can completely cover the magnetic circuit structure 202, that is, an orthogonal projection of the magnetic circuit structure 202 on the plate surface of the vibration portion 8 is located entirely within the plate surface of the vibration portion 8.

In this example, the mounting member 40 is arranged as the vibrating plate 5, and the vibrating plate 5 can vibrate with the magnetic circuit structure 202, which produces better effect on transmission of medium- and low-frequency sound.

Figure 15:
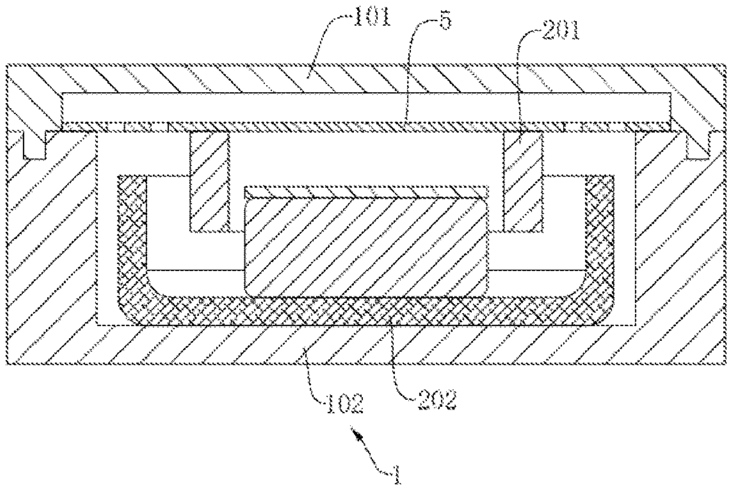
FIG. 15 is a schematic view of an overall structure of the sound generating unit in a second state in Example 4.

With reference to FIG. 15, in other application scenarios, the sound generating unit 20 is in a second state, the mounting member 40 is arranged as a vibrating plate 5, the coil 201 is mounted on the second housing 102 by the vibrating plate 5, and the vibrating plate 5 can vibrate with the coil 201 and transmit the vibration to the housing 1.

A headset, has a main structure the same as that of Example 2, and has the same differences from Example 1 as described previously in this example.

Example 5

Figure 16:
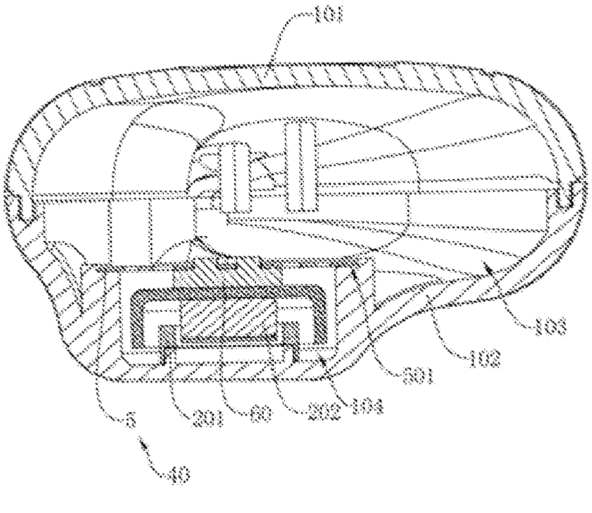
FIG. 16 is a schematic view of a mounting structure of a sound generating unit in a housing in Example 5.
Figure 17:
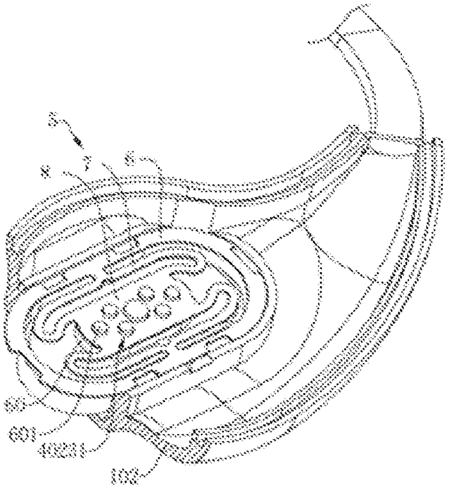
FIG. 17 is a schematic view of a connection structure of a vibrating plate and a gasket in Example 5.

As shown in FIGS. 16-17, a device of a polymeric bone conduction sound transmission component, has a main structure the same as that of the device of the polymeric bone conduction sound transmission component according to Example 4, and differences lie in that a separator is provided between the vibrating plate 5 and the magnetic circuit structure 202, and the separator can connect the vibrating plate 5 and the magnetic circuit structure 202 to each other, so that a gap is formed between the vibrating plate 5 and the magnetic circuit structure 202, and the gap is a vibration gap, and the vibration gap can provide a vibration space for the vibration portion 8, thereby reducing the probability that the magnetic circuit structure 202 collides with the connecting portion 7 without enlarging the area of the plate surface of the vibration portion 8.

In this example, the spacer is arranged as a gasket 60, the gasket 60 is in a waist-shaped plate shape, a thickness of the gasket 60 is greater than a thickness of the vibrating plate 5, and both sides of the gasket 60 are respectively glued and fixed to the base steel 2021 and the vibrating plate 5; and in production, the magnetic circuit structure 202 and the gasket 60 may be fixed to each other, and then the gasket 60 may be fixed to the vibrating plate 5.

In order to facilitate positioning and mounting of the spacer 60 and the vibrating plate 5, a fourth positioning structure is provided on the spacer 60, and a fifth positioning structure is provided on the vibration portion 8 of the vibrating plate 5, and the fourth positioning structure and the fifth positioning structure are intermeshed with each other to achieve positioning. Specifically, the fourth positioning structure may be arranged in a concave, convex or combined concave-convex shape, the fifth positioning structure matches the fourth positioning structure, the shape of the fourth positioning structure and the fifth positioning structure is not limited thereto, and the fourth positioning structure and the fifth positioning structure may be arranged in any structure as long as mutual positioning of the vibration portion 8 and the gasket 60 can be achieved.

In this example, the fourth positioning structure is arranged as a positioning post 601, a plurality of positioning posts 601 are integrally arranged on a surface of the gasket 60 fitted to the vibrating plate 5, and the positioning posts 601 are arranged as a cylindrical shape; and the fifth positioning structure is arranged as a positioning groove 40231, a plurality of positioning grooves 40231 are arranged on the vibration portion 8 in a penetrating manner, the positioning grooves 40231 are arranged as circular through grooves, and the positioning grooves 40231 correspond to the positioning posts 601 on a one-to-one basis. In this example, seven positioning posts 601 are provided in total, one of the positioning posts 601 corresponds to a central position of the vibrating plate 5, and the other six positioning posts 601 have identical diameter and are equally divided into two groups, the two groups of positioning posts 601 are spaced apart along a length direction of the vibrating plate 5 and are symmetrically arranged, and the diameter of the positioning post 601 at the central position of the vibrating plate 5 is greater than the diameters of the other six positioning posts 601; and the positioning posts 601 are inserted into the positioning grooves 40231 in a one-to-one manner to realize the positioning of the spacer 60 and the vibrating plate 5, which is more conducive to the assembly of the magnetic circuit structure 202 and the vibrating plate 5, and also can reduce the probability of transverse displacement between the vibrating plate 5 and the magnetic circuit structure 202.

In this example, since a size of the sound generating unit 20 in a thickness direction of the vibrating plate 5 is increased by the addition of the spacer 60, the size of the mounting region 104, the limiting groove 501 and the like can be adapted accordingly by those skilled in the art.

In this example, during operation of the device, the coil 201 is fixed relative to the housing 1, the magnetic circuit structure 202 vibrates, and the vibration of the magnetic circuit structure 202 is directly transmitted to the housing 1 by the mounting member 40, and is finally transmitted to the skull of the wearer. Compared with a traditional structure (the sound generating unit 20 is polymerized in an inner housing and then fixed on an outer housing), the structure in this example does not need to pass through the inner housing 1 in the process of vibration transmission, resulting in more direct transmission of vibration and less energy loss. In addition, during the operation of the device, only the magnetic circuit structure 202 vibrates (in the traditional structure, the whole sound generating unit 20 vibrates), weight of the vibrating component is small, the energy loss is small, and the risk of loose connection between the vibrating portion 8 and the housing 1 is low.

Figure 18:
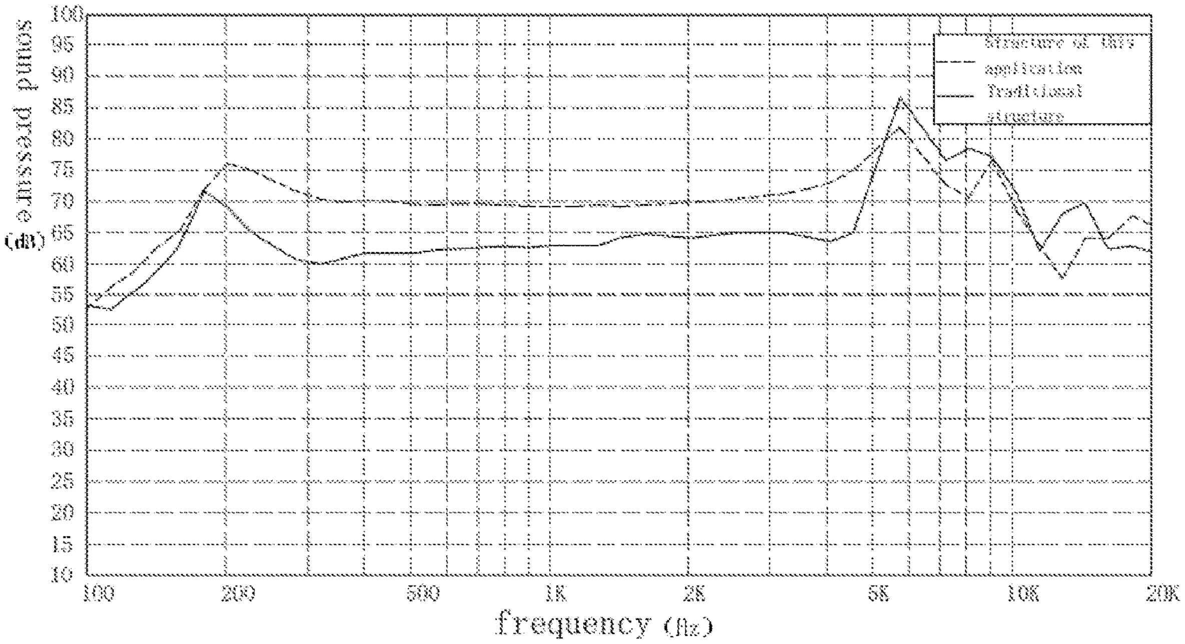
FIG. 18 is a frequency response diagram of a structure in Example 5 vs a traditional structure.

Referring to FIG. 18, which is a comparison of frequency response of the structure according to this example and the traditional structure, it can be seen that a sound pressure value of the structure disclosed in the present application is significantly higher than that of the traditional structure at medium and low frequencies.

Figure 19:
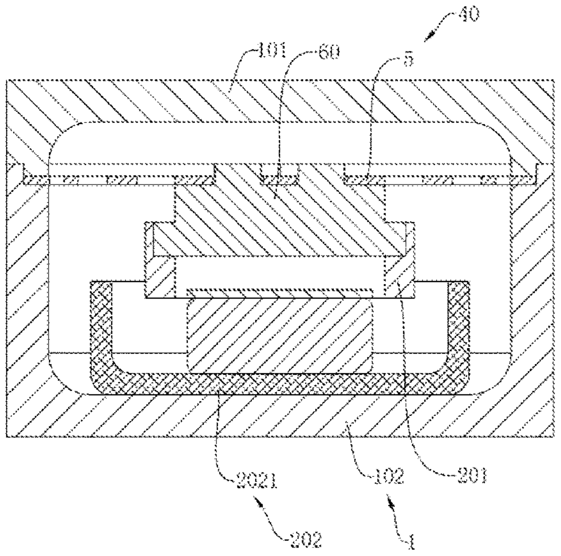
FIG. 19 is a schematic view of an overall structure of the sound generating unit in a second state in Example 5.

With reference to FIG. 19, in other application scenarios, the sound generating unit 20 is in a second state, the mounting member 40 is arranged as a vibrating plate 5, and the coil 201 is mounted on the second housing 102 by the vibrating plate 5; a spacer is provided between the coil 201 and the vibrating plate 5, the spacer is arranged as a gasket 60, the vibrating plate 5 is connected with the coil 201 by the gasket 60, and the gasket 60 is arranged so that a vibration gap is provided for the vibrating plate 5; and the vibrating plate 5 may vibrate with the coil 201 and transmit the vibration to the housing 1.

A headset, has a main structure the same as that of the headset in Example 4, and has the same differences from the device of the polymeric bone conduction sound transmission component according to Example 4 as described previously in this example.

Example 6

Figure 20:
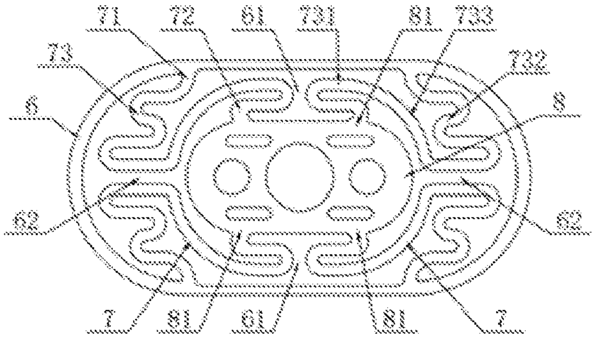
FIG. 20 is a detail view of a vibrating plate in Example 6.
Figure 21:
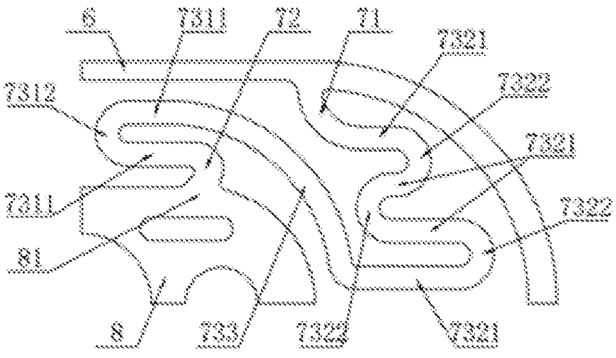
FIG. 21 is an enlarged view of a portion of FIG. 20.
Figure 22:
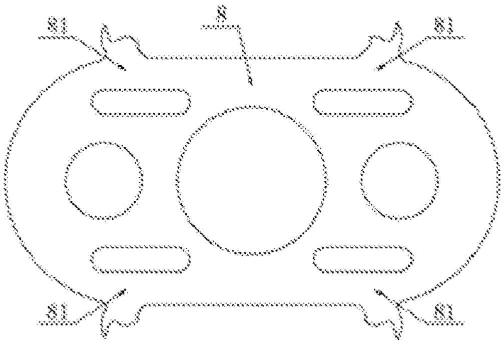
FIG. 22 is an enlarged view of a portion of FIG. 20.

As shown in FIGS. 20-22, a device of a polymeric bone conduction sound transmission component, has a main structure the same as that of the device of the polymeric bone conduction sound transmission component in Example 4 or the device of a polymeric bone conduction sound transmission component in Example 5, and differences lie in that the fixing portion 6 is arranged in a annular shape, and an inner annular shape and an outer annular shape of the fixing portion 6 are both in a racetrack shape; the connecting portions 7 are arranged on an inner circumference of the fixing portion 6, and the number thereof is 4; the vibration portion 8 is arranged on the inner circumference of the fixing portion 6, and an outer circumference of the vibration portion 8 is arranged in a racetrack shape, wherein a connecting position 81 (4 places) is provided at an intersection of each of straight-line segments and each of semicircular arc segments of the vibration portion 8; and one end of each of the connecting portions 7 is connected to a corresponding connecting position 81, and the other end is connected with the fixing portion 6.

Therefore, 1. the vibration portion 8 with the racetrack-shaped outer circumference can be changed in shape by adjusting a length of the straight-line segments and adjusting radius of the semicircular arc segments to adapt to the fixing portion 6 with a different shape, so that the fixing portion 6 adapted to the shape of a vibrator can better matches the vibrator; and 2. the connecting positions 81 are arranged at the intersection of each of the straight-line segments and each of the semicircular arc segments of the vibration portion 8, so that the connecting portions 7 are connected to the connecting positions 81 without stress concentration, thereby improving overall connection strength of the vibrating plate 5.

Each of the connecting portions 7 comprises a fixing segment 71 connected with the fixing portion 6, a vibration segment 72 connected with the vibration portion 8, and a main connecting segment 73 located between the fixing segment 71 and the vibration segment 72, so that the connecting portion 7 is connected with the fixing portion 6 and the vibration portion 8 by the fixing segment 71 and the vibration segment 72, and the main connecting segment 73 is structured to have an adaptive vibration performance.

The inner circumference of the fixing portion 6 in this example comprises a first spatial domain 61 located on one side (upper and lower sides) of each of the straight-line segments of the vibration portion 8 and a second spatial domain 62 located on one side (left and right sides) of each of the semicircular arc segments of the vibration portion 8 so as to divide an inner space into four regions, and the connecting portions 7 are arranged orderly in the four regions according to specific requirements.

Specifically, in this example, each of the main connecting segments 73 comprises a U-shaped first section 731 (located in the first spatial domain 61) and a W-shaped second section 732 (located in the second spatial domain 62), wherein each of the first sections 731 comprises two first extension segments 7311 (straight-lines extending in a left-right direction) and a first reverse arc segment 7312 connecting same sides of the two first extension segments 7311, wherein each of the second sections 732 comprises four second extension segments 7321 (straight-lines extending in a left-right direction) and a second reverse arc segment 7322 connecting same side of adjacent second extension segments 7321, and wherein the second extension segments 7321 are arranged apart up and down. In addition, the vibration segment 72 is arranged at one end of the first section 731, the fixing segment 71 is arranged at one end of the second section 732, and the other end of the first section 731 and the other end of the second section 732 are connected with a linking segment 733 therebetween, and the linking segment 733 has an arc shape extending in a circumferential direction of the semicircular arc segment of the fixing portion 6.

Therefore, 1. the first section 731, the second section 732 and the linking segment 733 are combined to form the main connecting segment 73 having a multi-fold type, and effective utilization of spaces in the first spatial domain 61 and the second spatial domain 62 results in sufficient length sufficient so as to ensure that the vibrating plate 5 has sufficient vibration performance; 2. the arc-shaped arrangement of the linking segment 733 allows it better to use the shape of the semicircular arc segment of the vibration portion 8, resulting in a more compact structure to make room for the arrangement of the first section 731 and the second section 732; and 3. the first extension segment 7311 is a straight-line extending in a left-right direction, which allows rational use of the straight-line of the vibration portion 8 extending in the left-right direction, and results in a simple structure, and optimizes the length of the first extension segment 7311 to increase the length of the main connecting segment 73 and thus to optimize the vibration performance; and the second extension segment 7321 is a straight-line extending in a left-right direction and is arranged up and down, which results in a more ordered and simple structure.

Preferably, in this example, a U-shaped opening of the first section 731 faces the adjacent second spatial domain 62, while a W-shaped double opening of the second section 732 faces the vibration portion 8 in a left-right direction, so that one end of the first section 731 which needs to be connected with the second section 732 faces the second spatial domain 62, and one end of the second section 732 which needs to be connected with the first section 731 faces the vibration portion 8 to achieve a shorter spacing therebetween, so that the linking segment 733 can connect them more smoothly, resulting in a more orderly and compact structure.

A length of each of the connecting portions 7 is L, and a thickness of the vibrating plate 5 is D, with $L/D \geq 3$, and $D<5$ mm.

Preferably, in this example, an axial compliance of the vibrating plate 5 is greater than a radial compliance, and the greater the axial compliance of the vibrating plate 5, the better the low-frequency effect is, and thus the frequency response effect of the vibrator can be effectively improved.

It should be noted that the vibrating plate in this example can be applied to the headset of this example, and may also be applied alone or in other headset products.

A headset, has a main structure the same as that of the headset in Example 4 or the headset in Example 5, and has the same differences from the device of the polymeric bone conduction sound transmission component in Example 4 or the device of the polymeric bone conduction sound transmission component in Example 5 as described previously in this example.

Example 7

Figure 23:
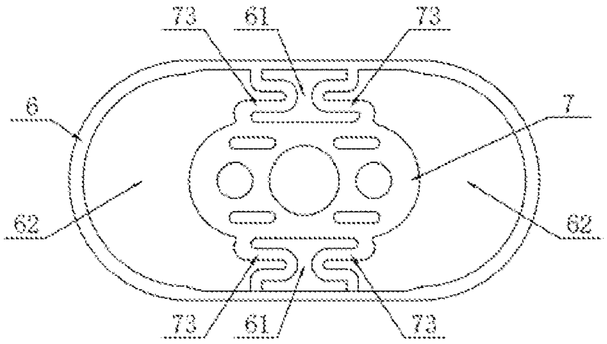
FIG. 23 is a detail view of a vibrating plate in Example 7.

As shown in FIG. 23, a polymeric bone conduction sound transmission component, has a same main structure as that of the polymeric bone conduction sound transmission component in Example 6, and differences lie in that each of the main connecting segments 73 is not provided with the second section 732 and the linking segment 733, and the fixing segment 71 and the vibration segment 72 are respectively arranged at both ends of the first section 731, so that the first section 731 is arranged only in the first spatial domain 61, which results in a more compact structure, and allows use in an environment with low vibration performance requirements.

In addition, since the main connection segment 73 is not arranged in the second spatial domain 62, positions of the left and right sides of the fixing portion 6 can be adjusted according to requirements to shorten an entire left-right length of the vibrating plate 5.

A headset, has a main structure the same as that of the headset in Example 6, and has the same differences from the device of the polymeric bone conduction sound transmission component according to Example 6 as described previously in this example.

Example 8

Figure 24:
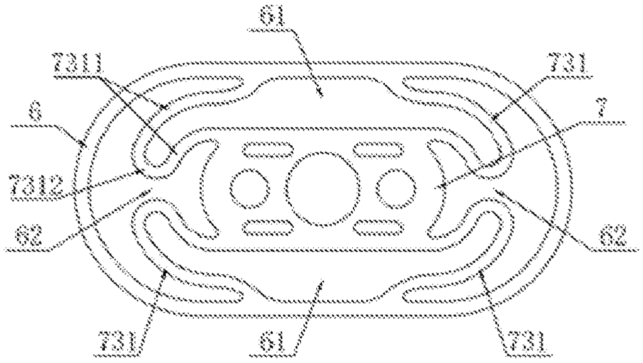
FIG. 24 is a detail view of a vibrating plate in Example 8.

As shown in FIG. 24, a device of a polymeric bone conduction sound transmission component, has a main structure the same as that of the device of the polymeric bone conduction sound transmission component in Example 6, and differences lie in that the second section 732 and the linking segment 733 are not provided, and the fixing segment 71 and the vibration segment 72 are respectively arranged at both ends of the first section 731; in addition, the first section 731 is arranged in the second spatial domain 62, and the first extension segment 7311 is arranged in an arc shape, with a center of each of the first extension segments 7311 located on a side of the first extension segment 7311 facing the vibration segment 3, so that the first section 731 is arranged in the second spatial domain 62 to increase the length of the first section 731, and the arc-shaped first extension segment 7311 better adapts to the shape of the semicircular arc segment of the vibratory portion 8, resulting in a more compact structure.

In addition, since the main connection segment 73 is not arranged in the first spatial domain 61, positions of the upper and lower sides of the fixing portion 6 can be adjusted according to requirements to shorten an entire up-down width of the vibrating plate 5.

A headset, has a main structure the same as that of the headset in Example 6, and has the same differences from the device of the polymeric bone conduction sound transmission component according to Example 6 as described previously in this example.

Example 9

Figure 25:
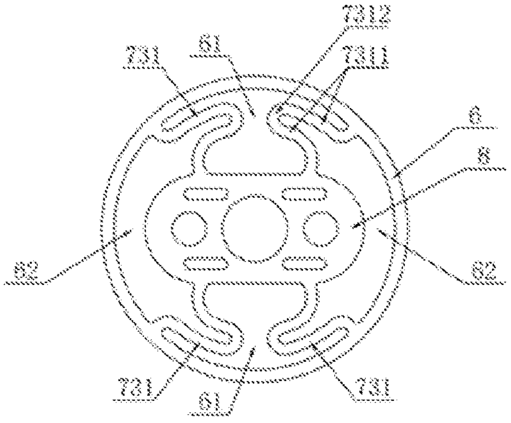
FIG. 25 is a detail view of a vibrating plate in Example 9.

As shown in FIG. 25, a device of a polymeric bone conduction sound transmission component, has a main structure the same as that of the polymeric bone conduction sound transmission component in Example 7, and differences lie in that the fixing portion 6 is a circular ring, and in addition, the first extension segment 7311 is arranged in an arc shape, and the center of each of the first extension segments 7311 is located on a side of the first extension segment 7311 facing the vibration portion 8, so that the arc-shaped first extension segment 7311 better adapts to the shape of the circular ring-shaped fixing portion 6 to increase the length of the main connecting segment 73.

A headset, has a main structure the same as that of the headset in Example 7, and has the same differences from the device of the polymeric bone conduction sound transmission component according to Example 7 as described previously in this example.

Example 10

Figure 26:
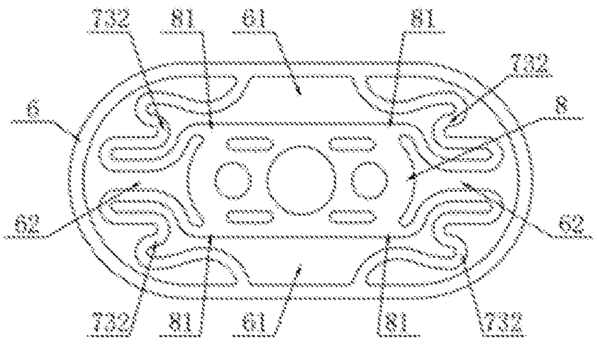
FIG. 26 is a detail view of a vibrating plate in Example 10.

As shown in FIG. 26, a device of a polymeric bone conduction sound transmission component, has a same main structure as that of the device of the polymeric bone conduction sound transmission component in Example 6, and differences lie in that each of the main connecting segments 73 is not provided with the first section 731 and the linking segment 733, and the fixing segment 71 and the vibration segment 72 are respectively arranged at both ends of the second section 732, so that the second section 732 is arranged only in the second spatial domain 62, which results in a more compact structure, and allows use in an environment with low vibration performance requirements.

In addition, since the main connection segment 73 is not arranged in the first spatial domain 61, positions of the upper and lower sides of the fixing portion 6 can be adjusted according to requirements to shorten an entire up-down width of the vibrating plate 5.

A headset, has a main structure the same as that of the headset in Example 6, and has the same differences from the device of the polymeric bone conduction sound transmission component according to Example 6 as described previously in this example.

Example 11

Figure 27:
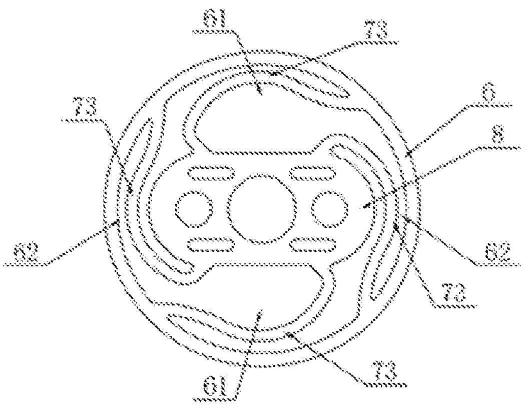
FIG. 27 is a detail view of a vibrating plate in Example 11.
Figure 28:
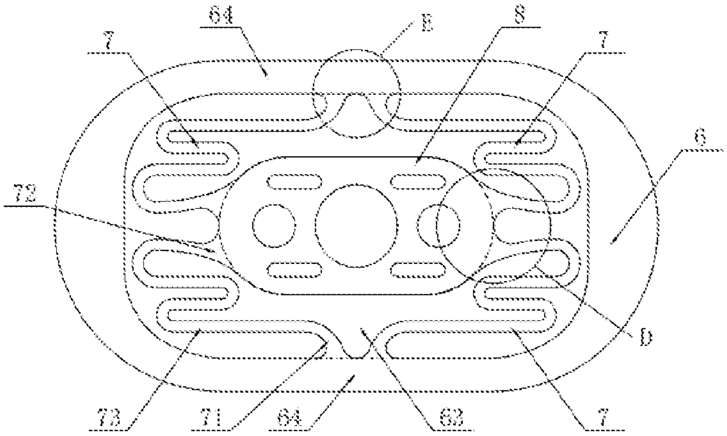
FIG. 28 is a detail view of a vibrating plate in Example 12.
Figure 29:
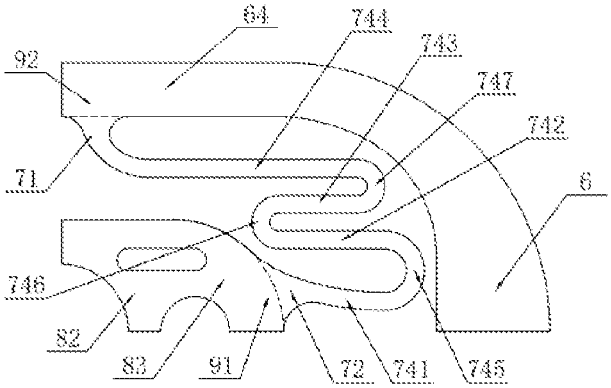
FIG. 29 is an enlarged view of a portion of FIG. 28.
Figure 30:
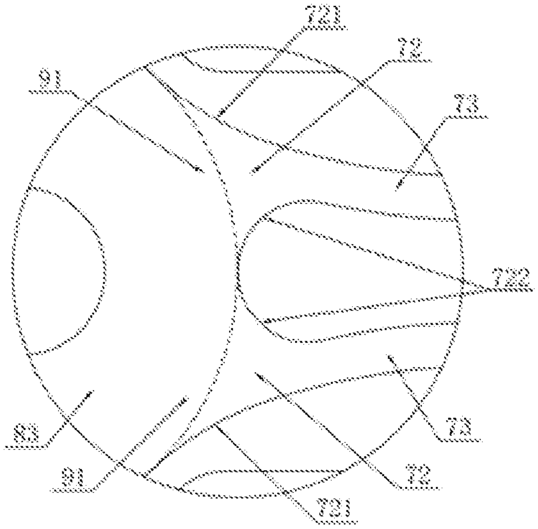
FIG. 30 is an enlarged view of D in FIG. 28.
Figure 31:
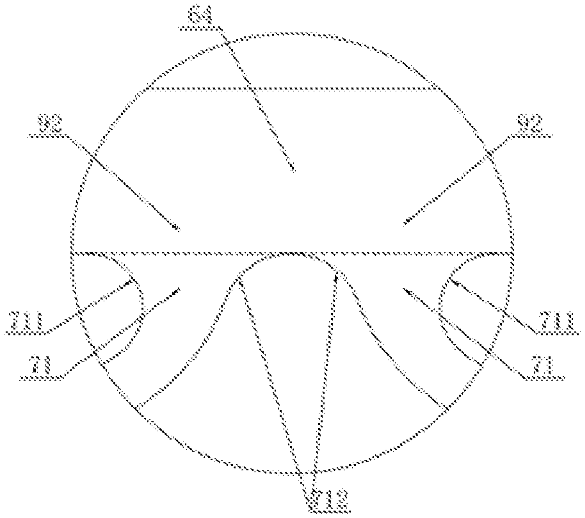
FIG. 31 is an enlarged view of E in FIG. 28.
Figure 32:
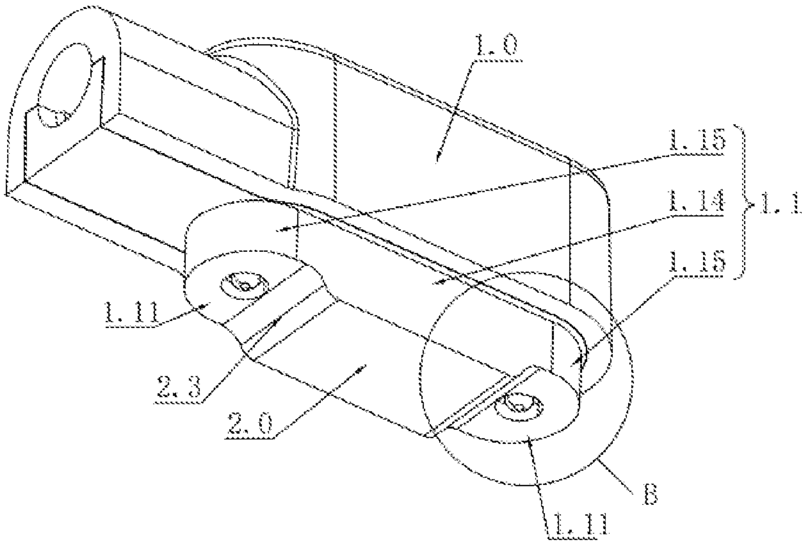
FIG. 32 is an assembly view of Example 18.
Figure 33:
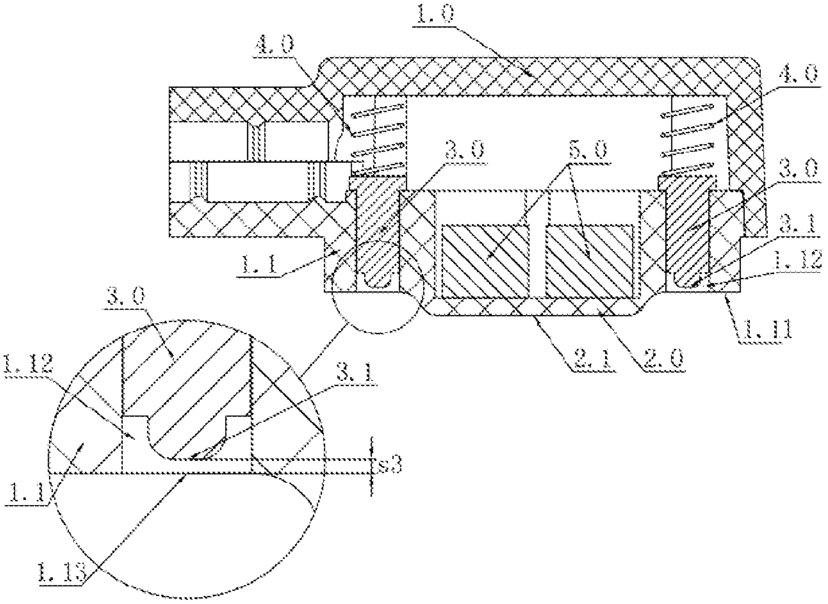
FIG. 33 is a sectional view of Example 18.
Figure 34:
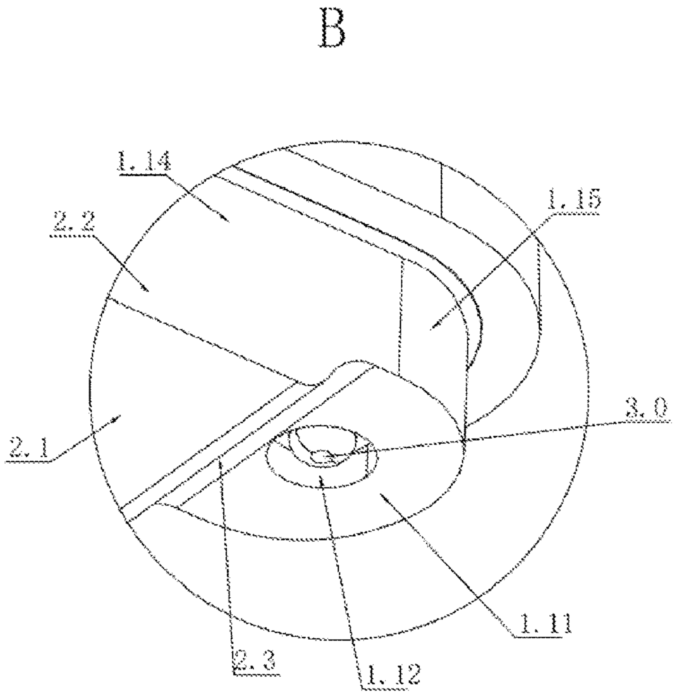
FIG. 34 is an enlarged view of B in FIG. 32.
Figure 35:
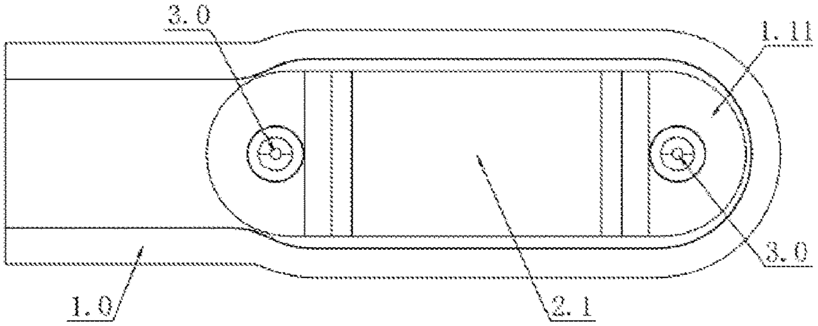
FIG. 35 is a bottom view of Example 18.

As shown in FIG. 27, a device of a polymeric a bone conduction sound transmission component, has a main structure the same as that in Example 6, and differences lie in that the fixing portion 6 is a circular ring, that is, an inner circumference and an outer circumference thereof are both arranged in a circular shape, each of the main connecting segments 73 is arranged in an arc shape, the center of each of the main connecting segments 73 faces the vibration portion 8, and the main connecting segments 73 are respectively located in a different first spatial domain 61 or second spatial domain 62.

Therefore, the arc-shaped main connecting segment 73 better adapts to the shape of the circular ring-shaped fixing portion 6 to increase the length of the main connecting segment 73, and the main connecting segments 73 are arranged in the first spatial domain 61 and the second spatial domain 62 respectively to improve space utilization of each domain.

A headset, has a main structure the same as that of the headset in Example 6, and has the same differences from the device of the polymeric bone conduction sound transmission component according to Example 6 as described previously in this example.

Example 12

As shown in FIGS. 28-31, a device of a polymeric bone conduction sound transmission component, has a main structure the same as that of the device of the polymeric bone conduction sound transmission component in Example 4 or the device of the polymeric bone conduction sound transmission component in Example 5, and differences lies in that:

- the fixing portion 6 is arranged in an annular shape, the outer circumference thereof is in a racetrack shape, the inner circumference of the fixing portion 6 is provided with an inner domain 63 (extending in a left-right direction) having an elongated shape, in particular a rectangular shape, and four corner ends of the inner domain 63 are arranged in an arc region;
- the vibration portion 8 is arranged in the inner domain 63, the outer circumference of the vibration portion 8 is arranged in a racetrack shape, so that the vibration portion 8 comprises a vibrating plate main portion 82 extending in a left-right direction and vibrating plate side portions 83 (an outer circumference thereof is in a semi-circular shape) located at both ends of a length of the vibrating plate main portion 82;
- the connecting portions 7 are arranged in the inner domain 63, and the number of the connecting portions 7 corresponding to each of the vibrating plate side portions 83 is 2; and
- the fixing portion 6 is respectively provided with side edges 64 (elongated shapes extending in a left-right direction) on upper and lower sides of the vibrating plate main portion 82, and one end of each of the connecting portions 7 is connected to the corresponding vibrating plate side portion 83, and the other end is connected to the side edge 64.

Therefore, 1. the elongated inner domain 63 enables the overall shape of the fixing portion 6 (the shape determines the shape of the vibrating plate) to be adjusted in length and width according to requirements to better adapt to a space available for the vibrating plate, and correspondingly, the vibrating plate main portion 82 of the vibration portion 8 is arranged in the elongated shape extending in the left-right direction to effectively utilize the left-right extension feature of the inner domain 63 to ensure the area of the vibration portion 8; and in this structure, the whole vibrating plate is arranged in an elongated structure to prevent bulkiness of the vibrating plate and application products thereof due to the vibrating plate in a circular structure with a large radius. 2. the outer circumferences of the vibrating plate side portions 83 at both ends of the vibrating plate main portion 82 are arranged in the circular arc shape to smoothly transition 4 corner ends of the vibrating plate main portion 82, so that the vibrating plate main portion 82 is less prone to stress concentration to improve service life of the vibrating plate; and 3. the vibration portion 8 and the fixing portion 6 are connected at left and right ends respectively by 4 connecting portions 7 to ensure connection stability; and further 2 connecting portions 7 on the vibrating plate side portions 83 at the left and right ends are connected with the upper and lower side edges 64 respectively, so that the four corners are connected more uniformly, further improving the connection stability.

Preferably, in this example, an adjacent first connecting position 91 is provided in the middle of the outer circumference of each of the vibrating plate side portions 83, an adjacent second connecting position 92 is provided in the middle of a length of each of the side edges 64, one end of each of the connecting portions 7 is connected to the corresponding first connecting position 91, and the other end thereof is connected to the corresponding second connecting position 92, so that a space between the fixing portion 6 and the vibration portion 8 is quartered in a circumferential direction, and the both ends of each of the connecting portions 7 are respectively located at the edges of the respective quartered spaces, so that the connecting portions 7 are arranged in the straightforward direction to enable more orderly and convenient structural design, and a sufficient space is provided to ensure that the length of the connecting portion 7 is sufficient.

Specifically, in this example, each of the connecting portions 7 comprises a fixing segment 71 connected with the fixing portion 6, a vibration segment 72 connected with the vibration portion 8, and a main connecting segment 73 located between the fixing segment 71 and the vibration segment 72; the main connecting segment 73 is arranged in a W shape to allow for more orderly space utilization through the reciprocating bending of the W-shaped main connecting segments 73, thereby increasing the length of the main connecting segment 73, and the W-shaped arrangement can meet most design requirements, effectively control the number of folded segments to make the structure more compact, and can realize easier adaptive design by adjusting the length of each of the segment to meet different vibration requirements.

Preferably, in this example, the W-shaped double opening of each of the main connecting segments 73 faces the vibration portion 8 along a length direction of the inner domain 63, so that both the fixing segment 71 and the vibration segment 72 face the first connecting position 91 and the second connecting position 92 better, resulting in a more orderly and convenient structural design.

Specifically, in this example, each of the main connecting segments 73 comprises a first segment body 741, a second segment body 742, a third segment body 743 and a fourth segment body 744, and the corresponding first segment body 741, second segment body 742, third segment body 743 and fourth segment body 744 are arranged close to the side edge 64 along a vertical direction, and sides of the first segment body 741 and the second segment body 742 facing away from the vibration portion 8 are provided with a first reverse segment 745 to connect same sides of the first segment body 741 and the second segment body 742; sides of the second segment body 742 and the third segment body 743 facing the vibration portion 8 are provided with a second reverse segment 746 to connect same sides of the second segment body 742 and the third segment body 743, and sides of the third segment body 743 and the fourth segment body 744 facing away from the vibration portion 8 are provided with a third reverse segment 747 to connect same sides of the third segment body 743 and the fourth segment body 744 to form the W-shaped main connecting segment 73 in an orderly combination.

Preferably, in this example, the two first segment bodies 741 corresponding to each of the vibrating plate side portions 83 are close to each other along the length direction of the inner domain 63 away from the corresponding first connecting position 91, and are in an arc shape, so that the arc-shaped first segment bodies 741 better adapt to the vibrating plate side portions 83 with the arc-shaped outer circumferences, achieving a smoother transition connection.

Preferably, each of the second segment body 742, the third segment body 743 and the fourth segment body 744 is in a straight-line extending in a left-right direction, so that the inner domain 63 extending in the left-right direction can be effectively used for the left-right extension, resulting in a simpler structure and a more orderly and convenient design.

Furthermore, in this example, a first side surface 721 and a second side surface 722 are respectively provided on upper and lower sides of each of the vibration segments 72 respectively; each of the first side surface 721 and the second side surface 722 is respectively connected with an outer circumferential wall of the corresponding vibrating plate side portion 83 and is arranged concentrically (with identical radius) or tangentially (with different radii), resulting in smoother transition and less possibility of stress concentration at the position where the two are connected, thus improving the service life of the vibrating plate.

Preferably, the second side surfaces 722 of the two vibration segments 72 corresponding to each of the vibrating plate side portions 83 are arranged tangentially connected with each other, so that an outer circumferential middle portion of the vibrating plate side portion 83 is completely covered by connection of the second side surfaces 722, resulting in a more concise structure with less lines, preventing a part of the outer circumferential middle portion structure of the vibrating plate side portion 83 being exposed due to separation of the second side surfaces 722 from each other.

Furthermore, in this example, a third side surface 711 and a fourth side surface 712 are respectively provided on both sides of each of the fixing segments 71, and each of the third side surface 711 and the fourth side surface 712 is respectively arranged tangentially to an outer wall of the corresponding side edge 64, resulting in smoother transition and less possibility of stress concentration at the position where the two are connected, thus improving the service life of the vibrating plate.

Preferably, in this example, the fourth side surfaces 712 of the two fixing segments 71 corresponding to each of the side edges 64 are connected and arranged concentrically (with identical radius) or tangentially (with different radii), so that the middle of the length of the side edge 64 is completely covered by the connection of the fourth side surfaces 712, resulting in a more concise structure with less lines.

A headset, has a main structure the same as that of the headset in Example 4 or the headset in Example 5, and has the same differences from the device of the polymeric bone conduction sound transmission component in Example 4 or the device of the polymeric bone conduction sound transmission component in Example 5 as described previously in this example.

Example 13

A headset, has a main structure the same as Example 2, and differences lie in that the linking portion 2-2 is not provided on the light transmission portion 2-1, and the housing 1 is connected with the rear pillow 2-0 by a structure provided at another position of the rear pillow 2-0, and is mounted to each other by snap-in, bonding, etc.

Example 14

A headset, has a main structure the same as Example 2, and differences lie in that: the light outlet 1-1 is arranged on left and right sides of the housing 1, that is, the light outlet 1-1 corresponding to the housing 1 on the left side is arranged on the left side of the housing 1, and the light outlet 1-1 corresponding to the housing 1 on the right side is arranged on the right side of the housing 1; the linking portion 2-2 is arranged on left and right sides of the light transmission portion 2-1, that is, the linking portion 2-2 on the light transmission portion 2-1 on the left side is arranged on the right side of the light transmission portion 2-1, and the linking portion 2-2 on the light transmission portion 2-1 on the right side is arranged on the left side of the light transmission portion 2-1; and in addition, the rear pillow 2-0 is arranged on a rear side of the light transmission portion 2-1, so that the linking portion 2-2 is inserted into the corresponding light outlet 1-1 from a side direction (the left-right direction), and emits light in the side direction (the left-right direction).

Example 15

A headset, has a main structure the same as Example 2, and differences lies in that the linking portion 2-2 is bonded or snap-in connected (a protrusion-recess fit) to the light transmission portion 2-1, and an outer circumference of the linking portion 2-2 adapts to the shape of the light outlet 1-1, so that the linking portion 2-2 is adaptively inserted into the light outlet 1-1; and in addition, a penetrating light transmission perforation is provided in the linking portion 2-2, so that light emitted by the light-emitting source 3-0 passes through the light transmission perforation and is directed to the light transmission portion 2-1 to cause the light transmission portion 2-1 to emit light.

The headset is in a split structure, which reduces maintenance cost of damaged components.

Example 16

A headset, has a main structure the same as Example 2, and differences lie in that the rear pillow 2-0 is U-shaped, and the light transmission portion 2-1 is bonded or snapped or coated on the rear pillow 2-0; or the rear pillow 2-0 is of a chain or rope or rubber strip, and the light transmission portion 2-1 is fitted to an end portion of the rear pillow 2-0. The headset is in a split structure, which reduces maintenance cost of damaged components.

Example 17

A headset, has a main structure the same as Example 2, and differences lie in that: no outer coating is provided, a frosted layer is provided on the outer circumference of the rear pillow 2-0, so that the rear pillow 2-0 integrally formed with the light transmission portion 2-1 also has a light transmission function, so that the rear pillow 2-0 will have a larger light-emitting area, resulting in better light-emitting effect; and the frosted layer prevents the rear pillow 2-0 from diffusely reflecting light, which diversifies the light-emitting effect.

Example 18

As shown in FIGS. 32-35, the present invention discloses a magnetic attraction connection structure, comprising: a connecting main portion 1.0, wherein a lower end thereof is downwards convexly provided with a plug-in protrusion 1.1, a lower end of the plug-in protrusion 1.1 is provided with a mounting surface 1.11, one end of the plug-in protrusion 1.1 located on the mounting surface 1.11 is convexly provided with a protective protrusion 2.0, and one end of the protective protrusion 2.0 facing away from the mounting surface 1.11 is provided with a magnetic attraction surface 2.1; and a plurality of connectors 3.0 which are fitted to the connecting main portion 1.0, and at least one of the connectors 3.0 and the other of the connectors 3.0 are arranged circumferentially on an outer circumference of the protective protrusion 2.0, and each of the connectors 3.0 is located on a side of the magnetic attraction surface 2.1 facing the mounting surface 1.11.

Therefore, 1. the magnetic attraction surface 2.1 is arranged on the protective protrusion 2.0, and the connectors 3.0 are separated in the middle by the protective protrusion 2.0 to increase a spacing between the connectors 3.0, so that upon magnetic attraction of a magnetically attractable object by the magnetic attraction surface 2.1, the magnetically attractable object is not easily shorted to the connector 3.0 to prevent the connectors 3.0 from shorting leading to line disorder; 2. the protective protrusion 2.0 is arranged protruding from the plug-in connector, so that the connector 3.0 is located on the side of the magnetic attraction surface 2.1 facing the mounting surface 1.11, thus a high-low misalignment between the magnetic attraction surface 2.1 and the connector 3.0 is achieved by means of the protruding structure, and upon the magnetic attraction of the magnetically attractable object on the magnetic attraction surface 2.1, the magnetically attractable body is not easily shorted to the connectors 3.0 to prevent the line disorder due to the shorting of the connectors 3.0; and 3. circumferential arrangement of the connectors 3.0 not only ensures that all the connectors 3.0 are located on the outer circumference of the protective protrusion 2.0, but also allows a greater spacing between the connectors 3.0 that are not allowed to be shorted.

In addition, in this example, a mounting hole 1.12 (extending vertically) is respectively provided on the plug-in protrusion 1.1 corresponding to each of the connectors 3.0, and a mounting opening 1.13 is provided at a lower end of each mounting hole 1.12 located on the mounting face 1.11, wherein each of the connectors 3.0 is respectively mounted on the corresponding mounting hole 1.12, enabling mounting of the connectors 3.0 by means of the mounting holes 1.12.

In this example, each of the connectors 3.0 is respectively slidably mounted in the corresponding mounting hole 1.12; furthermore, the connecting main portion 1.0 is respectively provided with a reset member 4.0 (a compression spring) corresponding to each of the connectors 3.0, the reset member 4.0 is located above the connector 3.0, and one end thereof abuts against the connector 3.0, and the other end thereof abuts against the connecting main portion 1.0, so that a reset force generated by the reset member 4.0 is used to drive the connector 3.0 to move out of the mounting hole 1.12 from the mounting opening 1.13, that is, resetting downwards.

Thus, the slidably arranged connector 3.0 works with the reset member 4.0 to ensure an elastic fit between the connector 3.0 and the corresponding connected component (e.g., a mating member 7.0 in a headset system), resulting in a smoother connection.

In other examples, the connector 3.0 is fixedly mounted in the corresponding mounting hole 1.12 by means of threaded connection, snap-fit, etc.

Furthermore, in this example, a lower end of each of the connectors 3.0 is provided with a contact end portion 3.1; each of the contact end portions 3.1 is located inside the mounting hole 1.12, and a spacing between the contact end portion 3.1 and the mounting opening 1.13 is s3, with $0<s3\leq 5$ mm, so that the contact end portion 3.1 built in the mounting hole 1.12 is protected by the mounting surface 1.11, and even if the magnetically attractable object approaches or even fits the mounting surface 1.11, the contact end portion 3.1 cannot be touched without entering the mounting opening 1.13 resulting in shorting, and a spacing of 0-5 mm prevents an excessive spacing which results in an excessive mating stroke and unsmooth fit.

In addition, in this example, the number of connectors 3.0 is 2, the connectors 3.0 can be a first functional member 3.2 (charging) or a second functional member 3.3 (data connection), and the two connectors 3.0 are arranged on opposite sides (left and right) of the protective protrusion 2.0, and when the number of connectors 3.0 is 2, a spacing between the two connectors 3.0 is maximized.

Specifically, in this example, an outer circumference of the plug-in protrusion 1.1 is in a racetrack shape, and the plug-in protrusion 1.1 comprises a straight-line portion 1.14 in the middle and circular arc portions 1.15 on left and right sides; the protective protrusion 2.0 is arranged on the straight-line portion 1.14, and the two connectors 3.0 are arranged on the circular arc portions 1.15 on the left and right sides; and the plug-in protrusion 1.1 is made to take advantage of the racetrack-shaped structure to allow for a smoother fit with a corresponding connected component (e.g., a plug-in recess 6.1 in a headphone system).

In other examples, the outer circumference of the plug-in protrusion 1.1 is in the shape of quadrangular prism, a square frustum, etc.

In addition, both sides of the protective protrusion 2.0 are provided with an integral surface 2.2 coplanar with an outer circumferential surface of the corresponding straight-line portion 1.14, so that the integral surface 2.2 is coplanar with the outer circumferential surface of the straight-line portion 1.14 to achieve a more compact structure.

In addition, in this example, an arc-shaped transition surface 2.3 is provided between the mounting surface 1.11 and the magnetic attraction surface 2.1, and the arc-shaped transition surface 2.3 is tangentially connected with the mounting surface 1.11 and the magnetic attraction surface 2.1 respectively, so that the arc-shaped transition surface 2.3 is configured to smoothly connect the mounting surface 1.11 and the magnetic attraction surface 2.1, ensuring a smoother connection with a corresponding connected component (e.g., a headset system).

This example further comprises a first magnetic attraction member 5.0, an upper side of the plug-in protrusion 1.1 is grooved so that the first magnetic attraction member 5.0 is placed in the groove, and is fixed by means of snap-in, bonding, etc., so that the first magnetic attraction member 5.0 acts to attract the magnetically attractable object towards the magnetic attraction surface 2.1.

Example 19

Figure 36:
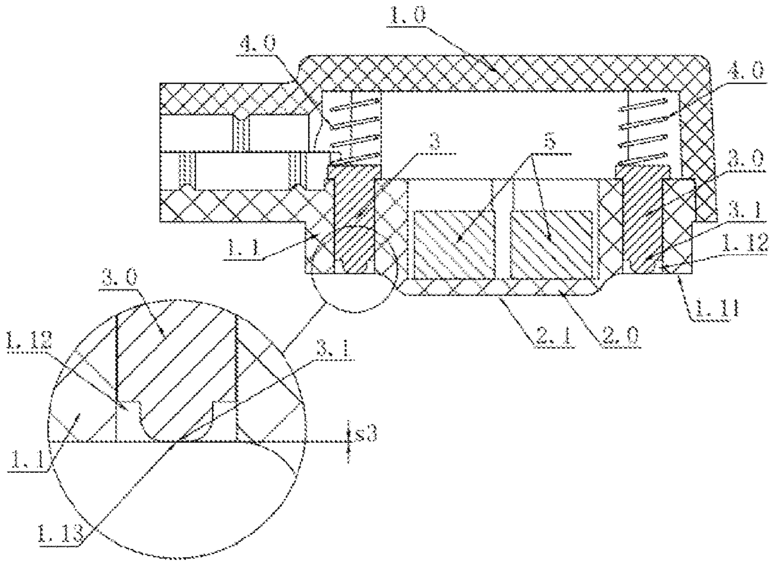
FIG. 36 is a sectional view of Example 19.

As shown in FIG. 36, a magnetic attraction connection structure, has a main structure the same as Example 18, except that s3=0. The contact end portion 3.1 is made flush with the mounting opening 1.13, while being protected by the mounting face 1.11, the spacing s1 is minimized to achieve contact between the connector 3.0 and the corresponding connected component at the first time.

Example 20

Figure 37:
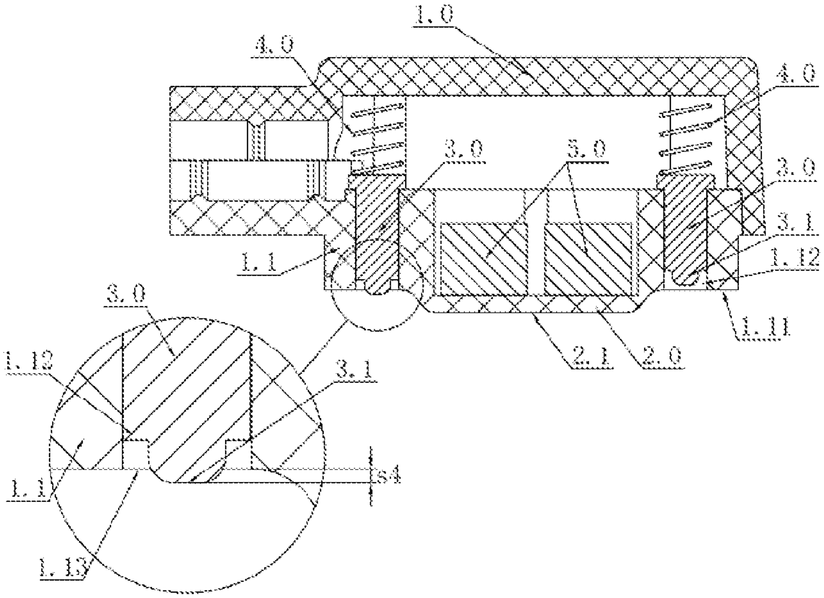
FIG. 37 is a sectional view of Example 20.

As shown in FIG. 37, a magnetic attraction connection structure, has a main structure the same as Example 18, and differences lie in that each of the contact end portions 3.1 is located outside the mounting hole 1.12, and a spacing between the contact end portion 3.1 and the mounting opening 1.13 is s4, with 0<s4≤5 mm.

The exposed contact end portion 3.1 allows a more rapid contact with the corresponding connected component.

Example 21

Figure 38:
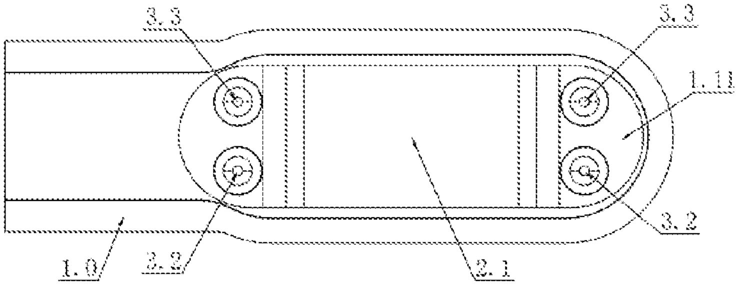
FIG. 38 is a sectional view of Example 21.

As shown in FIG. 38, a magnetic attraction connection structure, has a main structure the same as Examples 18-20, and differences lie in that the number of connectors 3.0 is 4, that is, two first functional members 3.2 (charging) and two second functional members 3.3 (data connection), the two first functional members 3.2 are arranged on opposite sides (left and right) of the protective protrusion 2.0, and the two second functional members 3.3 are arranged on opposite sides (left and right) of the protective protrusion 2.0.

Therefore, the connectors 3.0 can realize not only a charging function but also a data connection function, with various functions; and the first functional member 3.2 and the second functional member 3.3 have different functions, and shorting does not cause line disorder, so that left-right arrangement results in a more compact structure.

Example 22

Figure 39:
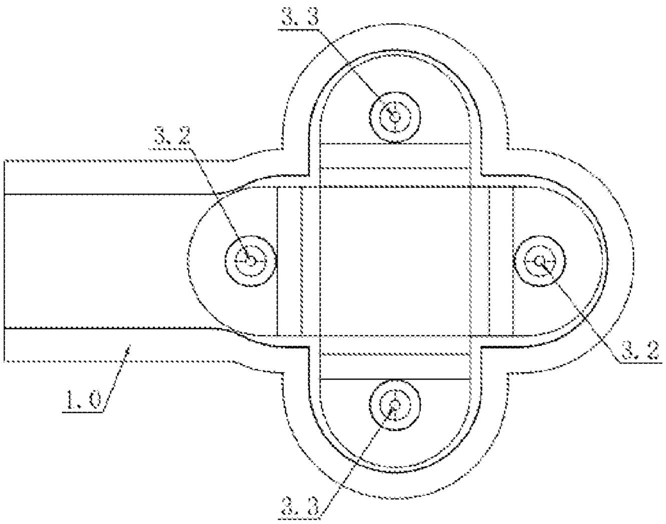
FIG. 39 is a sectional view of Example 22.

As shown in FIG. 39, a magnetic attraction connection structure, has a main structure the same as Examples 18-20, and differences lie in that the number of connectors 3.0 is 4, that is, two first functional members 3.2 (charging) and two second functional members 3.3 (data connection), the two first functional members 3.2 are arranged on opposite sides (left and right) of the protective protrusion 2.0, and the two second functional members 3.3 are arranged on opposite sides (front and rear) of the protective protrusion 2.0.

Therefore, the connectors 3.0 can realize not only a charging function but also a data connection function, with various functions; and front, rear, left and right directions of the protective protrusion 2.0 are effectively utilized, so that the possibility of mutual interference between the connectors 3.0 is optimized.

Furthermore, correspondingly, an outer circumference of the plug-in protrusion 1.1 has a 4-petal shape to adapt to the connectors 3.0 arranged in four directions.

Example 23

Figure 40:
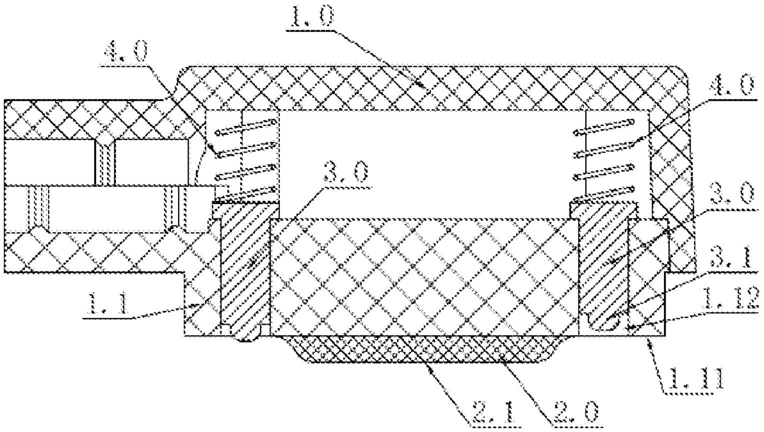
FIG. 40 is a sectional view of Example 23.

As shown in FIG. 40, a magnetic attraction connection structure, has a main structure the same as Examples 18-22, and differences lie in that instead of providing the first magnetic attraction member 5.0, the protective protrusion 2.0 is directly made of a magnetic attraction material, and the protective protrusion 2.0 is fixed on the plug-in protrusion 1.1 by means of snap-in, bonding, etc. Therefore, the magnetic attraction effect is optimized.

Example 24

Figure 41:
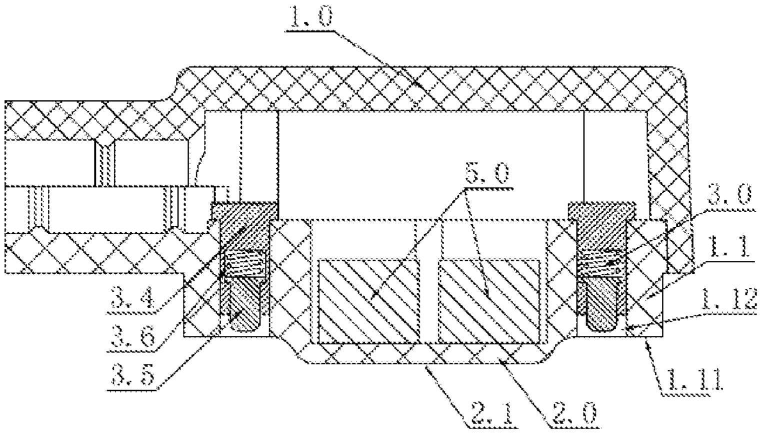
FIG. 41 is a sectional view of Example 24.
Figure 42:
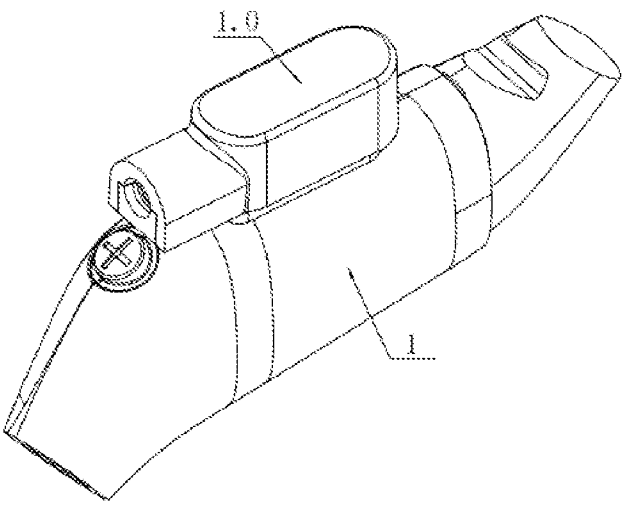
FIG. 42 is an assembly view of Example 26.
Figure 43:
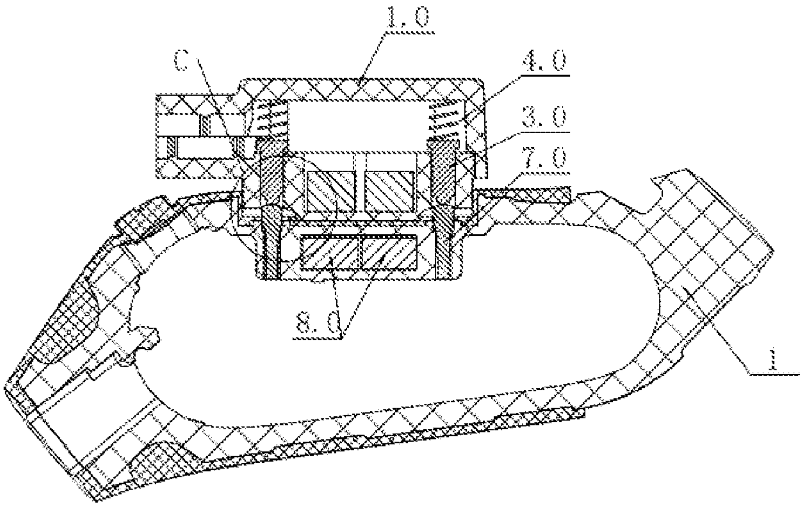
FIG. 43 is a sectional view of Example 26.
Figure 44:
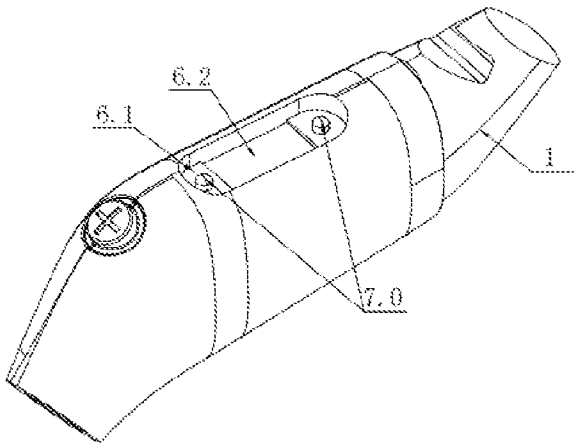
FIG. 44 is an assembly view of a housing in Example 26.
Figure 45:
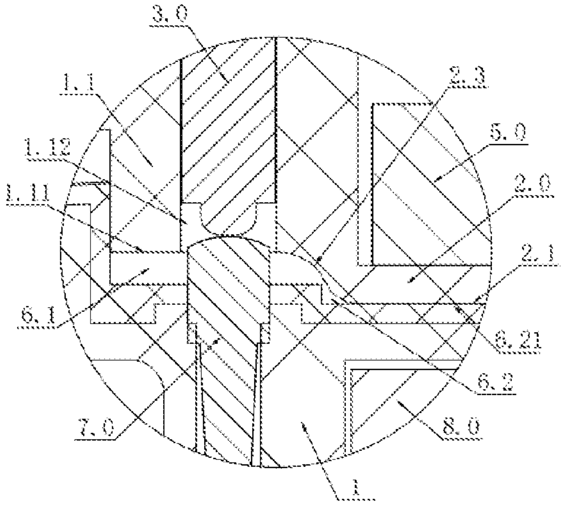
FIG. 45 is an enlarged view of C in FIG. 43.

As shown in FIG. 41, a magnetic attraction connection structure, has a main structure the same as Examples 18-23, and differences lie in that: each of the connectors 3.0 is a reset pin, and each of the reset pins comprises a base 3.4, a pin body 3.5 and a return spring 3.6; the base 3.4 is fixedly arranged in a corresponding mounting hole 1.12 by means of snap-in, bonding, etc.; the base 3.4 is internally provided with a hole, and a lower end of the hole is penetrating, so that the pin body 3.5 is inserted into the base 3.4 from the lower end and a shank is slidably mounted in the base 3.4; and the reset spring 3.6 is located in the hole of the base 3.4, and is pressed against the base 3.4 and the pin body 3.5 at both ends, so that the return spring 3.6 is configured to return the pin body 3.5 downward.

This makes the reset pin structure formed by a combination of the base 3.4, the pin body 3.5 and the reset spring 3.6 more stable, so that the combined structure can be pre-assembled (or purchased) to be directly inserted into the mounting hole 1.12 when assembling the magnetic attraction connection structure, further facilitating the assembly.

Example 25

The present invention discloses a connecting line comprising the magnetic attraction connection structure of any of Examples 18-24.

Example 26

As shown in FIGS. 42-45, the present invention discloses a headset system comprising: the device of the polymeric bone conduction sound transmission component or the headset of any of Examples 1-17 and the connecting line of Examples 25, wherein a plug-in recess 6.1 corresponding to the plug-in protrusion 1.1 and a protective recess 6.2 corresponding to the protective projection 2.0 are provided on the housing 1; a mating member 7.0 is provided in the plug-in recess 6.1 corresponding to each of the connectors 3.0; a mating surface 6.21 is provided on the protective recess 6.2 corresponding to the magnetic attraction surface 2.1; the plug-in protrusion 1.1 is inserted into the plug-in recess 6.1 in an aligned manner to perform alignment of the protective protrusion 2.0 and the protective recess 6.2 and alignment of each of the connectors 3.0 and the corresponding mating member 7.0; the protective protrusion 2.0 enters the protective recess 6.2 to enable the magnetic attraction surface 2.1 to magnetically attract and fit the mating surface 6.21; and each of the connectors 3.0 and the corresponding mating member 7.0 are brought into contact to make the connecting line conductive. The use of the headset system is thus safer.

In this example, a recess is provided in the housing 1, so that a second magnetic attraction member 8.0 is provided in the recess, and is fixed by means of snap-in, bonding, etc., so that when the housing 1 is connected with the connecting line for matching, the first magnetic attraction member 5.0 and the second magnetic attraction member 8.0 are magnetically attracted to each other to attract the magnetic attraction surface 2.1 and the mating surface 6.21.

Example 27

A headset, uses the sound generating portion of Example 5, the vibrating plate of Example 10, a button portion of Example 1, and a light-emitting structure portion of Example 2. In this example, a type-c interface is used instead of providing any magnetic attraction-related structure.

Example 28

A headset, uses the sounding portion of Example 5, the vibrating plate of Example 10, the button portion of Example 1, and the magnetic attraction structure of Example 26, with the structure of Example 24 acting as the specific connector 3.0.

This example does not provide any structure related to light emission.

What is claimed is:

1. A device of a polymeric bone conduction sound transmission component, comprising: a housing and a sound generating unit, wherein an accommodating cavity is formed in the housing, the sound generating unit comprises a coil and a magnetic circuit structure, the coil and the magnetic circuit structure are both arranged in the accommodating cavity, a mounting member is arranged in the accommodating cavity, and the sound generating unit is in a first state or a second state;

in the first state, the magnetic circuit structure is mounted on an inner wall of the housing by the mounting member, and the coil is mounted on the inner wall of the housing;

in the second state, the coil is mounted on the inner wall of the housing by the mounting member, and the magnetic circuit structure is mounted on the inner wall of the housing;

the mounting member is arranged as a vibrating plate capable of vibrating in a thickness direction thereof;

the magnetic circuit structure is mounted on the inner wall of the housing by the mounting member; the vibrating plate comprises a fixing portion, connecting portions and a vibration portion, the fixing portion is connected to the inner wall of the housing, the vibration portion is connected to the magnetic circuit structure, and the fixing portion and the vibration portion are connected by the connecting portions; and a separator is provided between the vibrating plate and the magnetic circuit structure so that a vibration gap is formed between the vibration portion and the magnetic circuit structure;

the spacer is arranged as a gasket, a fourth positioning structure is provided on the gasket, a fifth positioning structure is provided on the vibration portion, and the fourth positioning structure and the fifth positioning structure are intermeshed with each other; and the fourth positioning structure is arranged as a positioning post, the fifth positioning structure is arranged as a positioning groove, and the positioning post is embedded in the positioning groove.

2. The device according to claim 1, wherein:

the fixing portion is arranged in a annular shape; the connecting portion is arranged on an inner circumference of the fixing portion, and the number thereof is 4; the vibration portion is arranged on the inner circumference of the fixing portion, and an outer circumference of the vibration portion is provided in a racetrack shape, and a connecting position is provided at an intersection of each of straight-line segments and each of semicircular arc segments of the vibration portion; one end of each of the connecting portions is connected to the corresponding connecting position, and the other end is connected to the fixing portion; each of the connecting portions comprises a fixing segment connected with the fixing portion, a vibration segment connected with the vibration portion, and a main connecting segment located between the fixing segment and the vibration segment; and the inner circumference of the fixing portion comprises a first spatial domain located on one side of each of the straight-line segments of the vibration portion and a second spatial domain located on one side of each of the semicircular arc segment of the vibration portion.

3. The device according to claim 2, wherein: the inner circumference of the fixing portion is arranged in a circular shape, each of the main connecting segments is arranged in an arc shape, a center of circle of each of the main connecting segments faces the vibration portion, and each of the main connecting segments is respectively located in a different one of the first spatial domain or the second spatial domain; or each of the main connecting segments comprises a U-shaped first section and/or a W-shaped second section;

each of the first sections comprises two first extension segments and a first reverse arc segment connecting same sides of the two first extension segments; and each of the second sections comprises four second extension segments and a second reverse arc segment connecting same sides of adjacent second extension segments.

4. The device according to claim 3, wherein: each of the first sections is arranged in the first spatial domain, and an U-shaped opening of each of the first sections faces the adjacent second spatial domain; the inner circumference of the fixing portion is arranged in a circular shape; each of the first extension segments is arranged in an arc shape; and a center of circle of each of the first extension segments is located on a side of the first extension segment facing the vibration portion.

5. The device according to claim 3, wherein: each of the second sections is arranged in the second spatial domain, and a W-shaped double opening of each of the second sections face the vibration portion, and one end of each of the first sections is connected with one end of the corresponding second section.

6. The device according to claim 1, wherein:

the fixing portion is arranged in an annular shape, and the inner circumference of the fixing portion is provided with an inner domain having an elongated shape;

the vibration portion is arranged in the inner domain, the vibration portion comprises a vibrating plate main portion extending along a length direction of the inner domain and vibrating plate side portions located at both ends of a length of the vibrating plate main portion, and an outer circumference of each of the vibrating plate side portions is arranged in an arc shape;

the connecting portions are arranged in the inner domain, and the number of the connecting portions corresponding to each of the vibrating plate side portions is 2;

the fixing portion is provided with side edges on both sides of the vibrating plate main portion, one end of each of the connecting portions is connected to the corresponding vibrating plate side portion, and the other end is connected to the side edge; and an adjacent first connecting position is provided in the middle of the outer circumference of each of the vibrating plate side portions, an adjacent second connecting position is provided in the middle of a length of each of the side edges, one end of each of the connecting portions is connected to the corresponding first connecting position, and the other end is connected to the corresponding second connecting position.

7. The device according to claim 1, further comprising:

a manipulation button made of a hard material;

an elastic layer made of an elastic material, the manipulation button being in embedded connection with the elastic layer, the elastic layer being in embedded connected with the housing, and an action portion being provided on the manipulation button; and an electronic button fixedly provided on the housing, the electronic button being provided with a force-receiving portion directly facing the action portion, a spacing existing between the action portion and the force-receiving portion, and the spacing being s1;

wherein when the manipulation button is pressed, the action portion moves toward the force-receiving portion and presses the force-receiving portion, and the elastic layer is deformed; and when the manipulation button is not pressed, the elastic layer resets to move the action portion in a direction away from the force-receiving portion.

8. The device according to claim 7, wherein: the elastic layer comprises a deformation ring portion surrounding an outer circumference of the manipulation button, the deformation ring portion is arranged to extend radially inward along a direction of the force-receiving portion facing the action portion, an included angle between the deformation ring portion and an axial direction thereof is a, with $1° \leq a \leq 89°$, an inner circumference of the deformation ring portion is provided with an inner connecting portion surrounding and covering the manipulation button, an inner circumference of the inner connecting portion is provided with a first fitting surface in a cylindrical, table or cone shape, and the manipulation button is provided with a second fitting surface that matches the first fitting surface; the first fitting surface is inwards convexly provided with a reinforcing protrusion, the second fitting surface is concavely provided with a reinforcing recess for inserting the reinforcing protrusion, the reinforcing protrusion is arranged in an annular shape, and an inner circumference of the reinforcing protrusion is provided with a first mating cambered surface; and a shape and size of the reinforcing recess are adapted to a shape and size of the reinforcing protrusion, and a second mating cambered surface is provided in the reinforcing recess corresponding to the first mating cambered surface.

9. The device according to claim 8, wherein: the housing comprises a first half housing, a second half housing and a first circuit board, the electronic button is arranged on the first circuit board, the first circuit board is clamped between the first half housing and the second half housing for limiting and fixing, an outer circumference of the deformation ring portion is provided with an annular outer connecting portion, an axial end of the outer connecting portion abuts against the first circuit board, the other end abuts against the first half housing, a side of the first half housing facing the outer connecting portion is provided with a snap-in recess, and the outer connecting portion partially extends into the snap-in recess; a side of the deformation ring portion facing the outer connecting portion is arranged at one end of an inner circumference of the outer connecting portion facing the first circuit board, the first half housing is provided with a housing ring portion on a radial inner side located in the snap-in recess, an end of the housing ring portion facing the deformation ring portion is provided with an inclined ring surface, the inclined ring surface is arranged inclined radially inward along the direction of the force-receiving portion facing the action portion, and a separation gap is provided between the inclined ring surface and the deformation ring portion.

10. A headset, comprising the device of a polymeric bone conduction sound transmission component according to claim 1, a rear pillow and a light-emitting source, wherein a light outlet is provided on the housing;

the rear pillow is connected with the housing, the rear pillow is provided with a light transmission portion corresponding to the housing, and the light transmission portion is arranged at the light outlet; and the light-emitting source is arranged in the housing, and in a light-emitting state, light is emitted from the light outlet to the light transmission portion to cause the light transmission portion to emit light.

11. The headset according to claim 10, wherein: the light transmission portion is provided with a linking portion, and the linking portion is inserted into the housing from the light outlet to connect the rear pillow with the housing;

the linking portion and the light transmission portion are made of a same material and are integrally formed; or the linking portion is bonded or snap-connected to the light transmission portion, and an outer circumference of the linking portion is adapted to a shape of the light outlet; and a light-transmitting perforation is provided in the linking portion, so that the light emitted from the light-emitting source passes through the light-transmitting perforation and is emitted to the light transmission portion to cause the light transmission portion to emit light.

12. The headset according to claim 10, further comprising a plug connector, wherein: a first mounting jack is provided on the linking portion, a second mounting jack is provided on the housing, and the plug connector is respectively inserted into the first mounting jack and the second mounting jack to limit the linking portion from moving away from the light outlet;

the housing comprises a main housing, a second circuit board and a side cover, a mounting cavity having an opening is provided in the main housing, the second circuit board is loaded into the mounting cavity through the opening of the mounting cavity, and the side cover is arranged on the main housing and closes the opening of the mounting cavity; and the plug connector is located in the mounting cavity, and the second circuit board is arranged on a side of the plug connector facing the opening of the mounting cavity, and is configured to limit the plug connector from exiting the first mounting jack and the second mounting jack.

13. A headset system, comprising: the device of a polymeric bone conduction sound transmission component according to claim 1 and a connecting line; wherein:

the connecting line comprises a connecting main portion and a plurality of connectors; a plug-in protrusion is provided on the connecting main portion, one end of the plug-in protrusion is provided with a mounting surface, one end of the plug-in protrusion located on the mounting surface is convexly provided with a protective protrusion, and one end of the protective protrusion facing away from the mounting surface is provided with a magnetic attraction surface; each of the connectors is fitted to the connecting main portion, and at least one of the connectors and the other of the connectors are arranged circumferentially on an outer circumference of the protective protrusion, and each of the connectors is located on a side of the magnetic attraction surface facing the mounting surface;

the housing is provided with a plug-in recess corresponding to the plug-in protrusion and a protective recess corresponding to the protective protrusion thereon;

a mating member is provided in the plug-in recess corresponding to each of the connectors;

a mating surface is provided on the protective recess corresponding to the magnetic attraction surface; and the plug-in protrusion is inserted into the plug-in recess in an aligned manner to align the protective protrusion and the protective recess and align each of the connectors and the corresponding mating member, the protective protrusion enters the protective recess so that the magnetic attraction surface magnetically fits the mating surface, and each of the connectors and the corresponding mating member are brought into contact to make the connecting line conductive.

14. The headset system according to claim 13, wherein: a mounting hole is respectively provided on the plug-in protrusion corresponding to each of the connectors, each of the mounting holes is provided with a mounting opening on the mounting surface, and each of the connectors is respectively mounted on the corresponding mounting hole.

15. The headset system according to claim 14, wherein: each of the connectors is respectively slidably mounted in the corresponding mounting hole, the connecting main portion is respectively provided with a reset member corresponding to each of the connectors, and the reset member is configured to drive the connector to move out of the mounting hole from the mounting opening; or each of the connectors is a reset pin, each of the reset pins comprises a base, a pin body and a return spring, the base is fixedly provided with the corresponding mounting hole, the pin body is slidably mounted in the base, and the return spring is arranged between the base and the pin body, and the return spring is configured to drive the pin body to move out of the mounting hole from the mounting opening.

16. The headset system according to claim 14, wherein: one end of each of the connectors is provided with a contact end portion;

each of the contact end portions is located inside the mounting hole, and a spacing between the contact end portion and the mounting opening is s3, with $0 \le s3 \le 5$ mm; or each of the contact end portions is located outside the mounting hole, and a spacing between the contact end portion and the mounting opening is s4, with $0 < s4 \le 5$ mm.

17. The headset system according to claim 13, wherein: the number of the connectors are two, and the two connectors are arranged on opposite sides of the protective protrusion; or the number of the connectors is 4, two first functional members and two second functional members respectively, the two first functional members are arranged on opposite sides of the protective protrusion, the two second functional members are arranged on the opposite sides of the protective protrusion, and each of the first functional members is arranged on a same side as or adjacent to one of the second functional members.

* * * * *